United States Patent
Luo

(10) Patent No.: US 11,119,299 B2
(45) Date of Patent: Sep. 14, 2021

(54) AREA SCANNING CONFOCAL MICROSCOPY (ASCM)

(71) Applicant: BADEN-WÜRTTEMBERG STIFTUNG gGmbH, Stuttgart (DE)

(72) Inventor: Ding Luo, Karlsruhe (DE)

(73) Assignee: BADEN-WÜRTTEMBERG STIFTUNG GMBH, Stuttgart (DE)

(*) Notice: Subject to any disclaimer, the term of this patent is extended or adjusted under 35 U.S.C. 154(b) by 0 days.

(21) Appl. No.: 16/598,814

(22) Filed: Oct. 10, 2019

(65) Prior Publication Data
US 2020/0116988 A1    Apr. 16, 2020

(30) Foreign Application Priority Data

Oct. 11, 2018 (EP) .................... 18199927

(51) Int. Cl.
*H04N 7/18* (2006.01)
*G02B 21/00* (2006.01)

(52) U.S. Cl.
CPC ..... *G02B 21/0032* (2013.01); *G02B 21/0064* (2013.01)

(58) Field of Classification Search
CPC ...... H04N 9/47; G02B 21/00; G02B 21/0032; G02B 21/0064

USPC .......................................................... 348/79
See application file for complete search history.

(56) References Cited

U.S. PATENT DOCUMENTS

| | | | | |
|---|---|---|---|---|
| 7,834,975 B2* | 11/2010 | Burghoorn | .......... | G03F 7/70283 355/53 |
| 8,426,812 B2* | 4/2013 | Bean | .................... | G02B 21/367 250/306 |
| 8,693,091 B2* | 4/2014 | Szabo | .................... | G02B 27/58 359/384 |
| 9,910,255 B2* | 3/2018 | Berner | .............. | G02B 21/0092 |

* cited by examiner

*Primary Examiner* — Trang U Tran
(74) *Attorney, Agent, or Firm* — Quinn IP Law

(57) ABSTRACT

An area scanning confocal microscope includes a pattern generation unit configured to generate or produce a line pattern comprising a plurality of lines, for example a plurality of straight parallel lines; a projection unit comprising a microscope objective configured to project the line pattern onto an object through the microscope objective, wherein the focal plane in which the line pattern is projected or imaged is tilted at a tilting angle with respect to an optical axis of the microscope, the tilting angle being equal to or greater than 0° and smaller than 90°, for example between 30° and smaller than 85°; and an imaging unit comprising a two-dimensional image detector configured to capture within one image frame of the image detector an image of the projected line pattern.

11 Claims, 11 Drawing Sheets

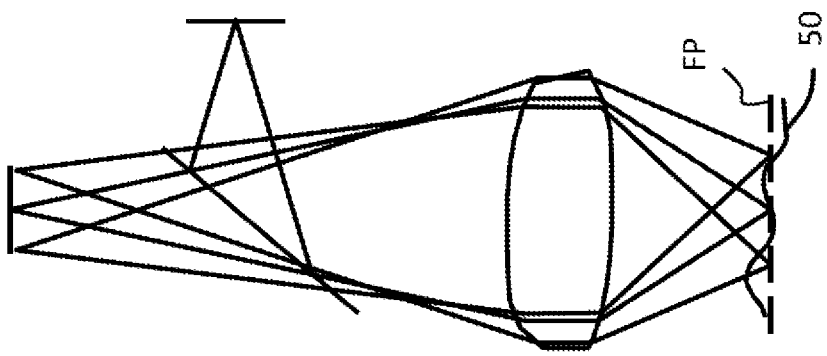
Fig. 1C
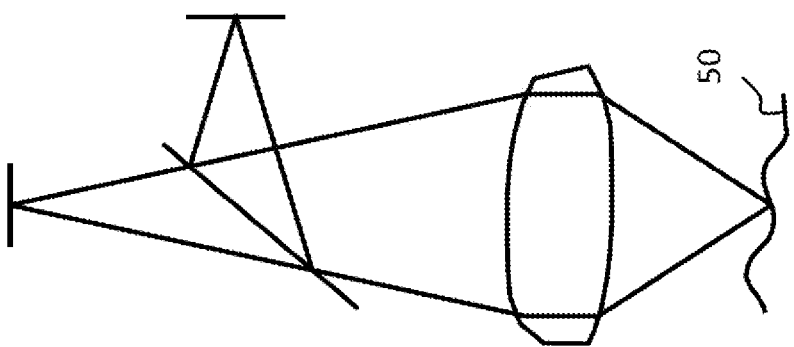
Fig. 1B
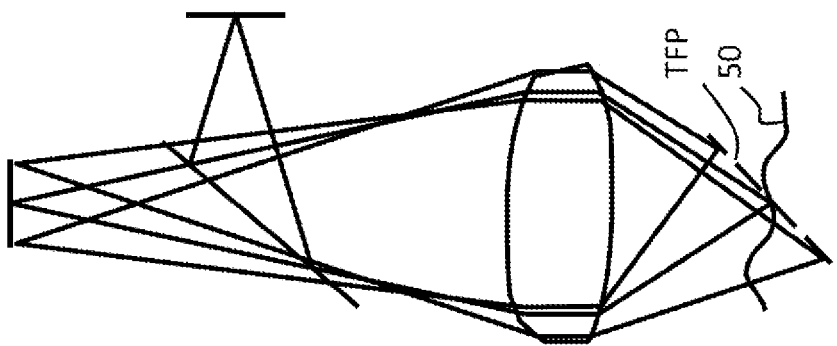
Fig. 1A
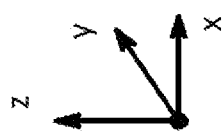

AREA SCANNING CONFOCAL MICROSCOPY (ASCM)

The present invention relates to a confocal microscope and the method for confocal microscopic measurement.

Since the invention by Marvin Minsky in 1957 [U.S. Pat. No. 3,013,467 A], confocal microscopy has become one of the most important technologies for 3D measurement. Due to its noninvasive property and unique depth discerning capability, confocal microscope has been widely applied in both academia and industry. Throughout the last half-century, various research efforts have been invested into the improvement of confocal technology, mainly in two directions: to enhance the resolution/sensitivity of the measurement and to increase the speed of measurement.

The present invention is mainly concerned with the second task, i.e. increasing the speed of the confocal microscopic measurement.

Conventional confocal systems suffer from a slow measurement speed due to the requirement of mechanical scanning both laterally (x-y) and axially (z). Most of the development regarding confocal microscopic systems focuses on either reducing the necessity for mechanical scanning or the acceleration of the scanning velocity. In the x-y directions, Mojmir Petran and Milan Hadraysky first proposed in 1967 to use a Nipkow disk to generate a confocal condition for multiple points in a microscope [U.S. Pat. No. 3,517,980 A]. The setup is designed for direct viewing but the adoption of Nipkow disk has the potential of reducing the measurement time of a 3D scanning as multiple points are scanned in parallel.

Albert Frosch and Hans Erdmann Korth demonstrated a confocal setup based on a one-sided Nipkow disk where illumination and imaging are sharing the same pinholes in their 1975 patent [U.S. Pat. No. 3,926,500 A].

Apart from confocal setups using Nipkow disk to generate a point array, a different line of research focuses on a line of points using a scanning slit. Earliest development dates back to a research article by G. M. Svishchev in 1969 [Research Article 1]. With a confocal slit for illumination and imaging, mechanical scanning in one lateral direction is completely removed, so that a 3D measurement requires mechanical scanning in only two directions (the remaining lateral direction and the axial direction). A research article by C. J. R Sheppard and X. Q. Mao in 1988 [Research Article 2] laid a theoretical foundation for slit scanning confocal microscopy through investigation into the point spread function.

With the development of electro-optical technologies as well as MEMS technologies, various kinds of spatial light modulators have been applied to replace the Nipkow disk to generate an array of confocal points, such as using a digital mirror device (DMD) [Research Article 3], where each micro mirror serves as an individual pinhole. In the axial direction, the most important development is centered on the chromatic confocal technology first proposed by G. Molesini et al. in a research article in 1984 [Research Article 4]. A light source with wider spectrum is coupled with an objective lens with designed dispersion, so that different wavelengths are focused to different axial positions. By recording the spectrum of the reflected light, the necessity of axial mechanical scanning is effectively eliminated. An exemplary spectrally encoded slit confocal microscopy is described in Research Article 5.

State-of-the-art confocal systems typically combine the aforementioned approaches with powerful lasers, very efficient light detectors and powerful computers to achieve fast scanning speed. However, a fundamental problem has never been tackled, i.e. whether it is possible to make a direct area scan. In a slit scanning microscope or a point array microscope, either achieved through Nipkow disk or other spatial light modulators such as DMDs, the measurement points can never densely cover the complete 2D area. This is because light which is not in focus will generate a blurred spot laterally where light intensity is spread across its adjacent area. Such intensity inevitably generates a certain level of crosstalk between two measurement points, which is inversely proportional to their distance. In the case of a slit scanning setup, the space orthogonal to the slit direction offers room for the spreading defocus intensity, so that the crosstalk between points along the slit is sufficiently small. In terms of a point array scanning setup, it has been shown both theoretically and experimentally that a minimum pitch distance is required for a point array to remain sensitive to the depth change of a planar object [Research Article 3]. In the extreme case where the surface is densely illuminated and imaged in both x and y direction, the confocal setup is reduced to a wide-field microscope without depth discerning capability, and therefore cannot be used for 3D measurement.

REFERENCES

Patent Publications

[U.S. Pat. No. 3,013,467 A] Microscopy apparatus
[U.S. Pat. No. 3,517,980 A] Method and arrangement for improving the resolving power and contrast
[U.S. Pat. No. 3,926,500 A] Method of increasing the depth of focus and or the resolution of light microscopes by illuminating and imaging through a diaphragm with pinhole apertures

Research Articles

[I] G. M. Svishchev, "Microscope for the study of transparent light-scattering objects in incident light", Optics and Spectroscopy vol. 26 pp. 171-172, 1969, St Petersburg, Russia;
[2] U. R. Sheppard & X. Q. Mao (2007) "Confocal Microscopes with Slit Apertures", Journal of Modem Optics, 35:7, 1169-1185;
[3] Minhua Liang, Robert L Stehr, and Andrew W. Krause, "Confocal pattern period in multiple-aperture confocal imaging systems with coherent illumination," Opt. Lett. 22, 751-753 (1997)
[4] G. Molesini, G. Pedrini, P. Poggi, and F. Quercioli, "Focus-wavelength encoded optical profilometer", Opt. Commun. 49(4), 229-233 (1984);
[5] J. Kim, D. Kang, and D. Gweon, "Spectrally coded slit confocal microscopy", Optics Letters, Vol. 31, Issue 11, pp. 1687-1689 (2006).

The present invention addresses the above problems and provides a new confocal microscopy method and an apparatus of direct area scanning for 3D optical measurement employing tilted focal plane or field. Advantageously, a highly tilted illumination field and imaging field are combined so that preferably every lateral location satisfies the confocal condition.

An aspect of the present invention relates to an area scanning confocal microscope, also referred to as an area confocal scanning microscope. The area scanning confocal microscope comprises:

a pattern generation unit configured to generate or produce a line pattern comprising a plurality of lines;

a projection unit comprising a microscope objective configured to project the line pattern onto an object through the microscope objective, wherein the focal plane in which the line pattern is projected or imaged is tilted at a tilting angle with respect to an optical axis of the microscope, the tilting angle being equal to or greater than 0° and smaller than 90°; and an imaging unit comprising a two-dimensional image detector configured to capture within one image frame of the image detector an image of the projected line pattern.

A further aspect of the invention relates to a method for performing area scanning confocal measurement of an object using a confocal microscope, for example a confocal microscope according to aspects of the invention. The method comprises:

generating or producing a line pattern comprising a plurality of lines;

projecting the line pattern through a microscope objective of the confocal microscope onto the object, wherein the focal plane in which the line pattern is projected or imaged is tilted at a tilting angle with respect to an optical axis of the microscope, the tilting angle being equal to or greater than 0° and smaller than 90°;

capturing by a two-dimensional image detector within one image frame of the image detector an image of the projected line pattern.

In the confocal microscope and method according to the above aspects, a whole area, rather than a single point or line of points is imaged within one image frame captured by a two-dimensional image detector. Such direct area confocal measurement was generally considered impossible due to the fundamental limitations of illumination and imaging. This has only been partly circumvented by a spectrally coded slit confocal microscope, where one lateral axis is tackled with a physical slit and the orthogonal lateral axis is covered by a lateral dispersion of the slit (Research Article 5). The area scanning confocal microscope and method according to aspects of the invention present a new approach for direct area confocal measurement based on a completely different principle, which provides additional benefits for the complete scanning process, in particular in terms of speed.

In particular, the proposed area scanning confocal microscope and method employ tilted focal plane or field, i.e. a focal plane or field, which is tilted with respect to the optical axis or with respect to a plane normal to the optical axis of the microscope, so that preferably each line of the line pattern is projected or imaged at a different height along the optical axis of the microscope. Typically, the plane normal to the optical axis of the microscope is the object plane, i.e. the plane in which the object to be measured is placed. Thus, each line is projected or imaged at a different depth in the object space, i.e. each line addresses a different depth in the object space. It has been surprisingly found out that there exists a relatively small angular range for the tilting angle of the focal plane, where the intensity of the detected light becomes concentrated around the focus, leading to a capability of depth discerning. The angular range in which a depth measurement is possible is dependent on the numerical aperture used. For numerical apertures typically used in confocal microscopes the tilting angle, for which depth discrimination is possible, may be generally equal to or greater than 30° and smaller than 90° (at 90° no depth discrimination is possible), for example in the range of 50° to 85° or in the range of 65° to 85°. Generally, as the NA becomes larger, a larger angular working distance is allowed. For example, for NA=0.33 the range of the tilting angle in which depth measurement is possible may be 65° to 85°, for NA=0.5, the possible range may be 50° to 85°, for NA=0.75, the possible range may be 30° to 85°. The optimum tilting angle for carrying out depth measurements also varies with the specific numerical aperture used, for example for NA=0.33 it is about 75°, for NA=0.5 it is about 67.5°, for NA=0.75 it is about 55°. As the tilting angle deviates from an optimum tilting angle (which depends on the numerical aperture) the measurement sensitivity decreases gradually until the depth discern capability is lost.

The pattern generation unit may comprise a light source, such as a laser or LED. The light source may be a broadband light source, a swept light source, etc. The patent generation unit may also comprise a controllable spatial light modulator (SLM) arranged in reflection or transmission mode, for example a digital mirror device (DMD), a Liquid Crystal SLM, etc. The SLM enables controllable generation and/or change (e.g. movement or scanning) of the line pattern. It is also possible to use a programmable light source, such as an array of lasers or LEDs that also enables a controlled generation and/or change of the line pattern. The pattern generation unit may comprise further elements, such as lenses, mirrors, beamsplitters, beam shapers, etc.

The lines of the generated illumination pattern may be straight parallel lines with a constant distance therebetween. However, the lines need not be straight lines and may be curved lines. Further, the distance between the lines may vary. The curvature of the lines and/or the variable distance may, for example, be selected such as to at least partially correct to aberrations of the projecting and/or image capturing optics, so that the lines of the line pattern projected in the object space and/or of the pattern captured by the image camera are straight, parallel lines with a constant distance therebetween.

The projection unit may comprise, in addition to the microscope objective, one or more optical elements (such as achromatic objectives, beams splitters, mirrors, lenses, etc.) selected and arranged to image/project the line pattern in a focal or image plane or field, which is tilted with respect to the optical axis of the microscope (typically denoted as z-axis). The focal plane/field thus does not lie within a plane normal to the optical axis (e.g. in a x-y plane) but forms an angle with it (tilting angle), with for example the y-axis or the x-axis or any other axis in the x-y plane being the axis of rotation of the focal plane. The tilting angle is typically expressed as the angle between the normal to the focal plane x-y and the normal to the optical axis or z-axis. Other definitions may be also be used, such as for example the angle between the x- or y-axis in the x-y plane normal to the optical axis or z-axis (i.e. plane before rotation or tilt) and the x- or y-axis, respectively in the tilted or rotated focal plane.

The two-dimensional image detector (camera) may comprise a plurality of elements (pixels) arranged in a plane. In principle, any camera may be used. Advantageously, the camera may be a high speed camera with a good dynamic range. The imaging unit may comprise, in addition to the two-dimensional image detector, other optical elements, such as an achromatic objective (e.g. a tube lens), beams splitters, mirrors, beam traps, etc.

Some of the optical elements, such as the beam splitter and the microscope objective, may be shared by both the illumination and the imaging arm of the microscope and more specifically by both the projection unit and the imaging unit. For example, the projected line pattern may be imaged onto the image detector via the same microscope objective through which the line pattern is projected onto the object.

Preferably, the highly tilted illumination field and imaging field are combined so that every lateral location satisfies the confocal condition. In an exemplary realization of the area scanning confocal microscope, the image detector elements (pixels) serve as pinholes. Similarly, if the pattern generation unit and/or pattern projection unit employs pixelized spatial light modulators or other rasterized optical elements (such as microlens arrays) the individual elements or pixels may serve as pinholes, so that a confocal setup is realized.

The two-dimensional image detector (camera) captures an image of the whole projected two-dimensional line pattern within one image frame. The captured image may be further processed by a processing unit (which may be a part of the confocal scanning microscope) to extract depth information from the intensity signal detected from the image detector. The processing unit may be implemented in circuitry, in computer hardware, firmware, software, or in combinations of them. The captured image may be processed for example by applying Gaussian fitting. For example, Gaussian fitting with a fitting function in the form $y=A \cdot \exp(-(x-\mu)^2/(2\sigma^2))$ may be implemented for several axial positions centered around the position with maximum intensity. At the center position of the Gaussian peak $\mu$ is considered as the height (depth) of the object, while a is directly related to the FWHM of the signal peak. Instead of using raw Gaussian fitting, it is possible to employ other specifically tailored fitting mechanisms to better account for the peak shape and better interpret the detected intensity signal obtained from the proposed direct area scanning. This might contribute to improving the measurement accuracy.

To obtain 3D measurement data, either the object or the line pattern or both may be moved or scanned along a one-dimensional scanning direction. The scanning direction may be chosen arbitrarily, as long as it is not parallel with the illumination/imaging field, i.e. not parallel to the focal plane/field. The two most common scanning directions are along the x-axis or the z-axis. To perform scanning, the area scanning confocal microscope may include a scanning unit configured to perform scanning in a predetermined (one dimensional) scanning direction. Since within one image frame a whole area is captured, the scanning needs to be performed in one direction only (e.g. in x or z direction). This considerably increases the speed of the 3D measurement. Preferably, the scanning is realized by moving the line illumination pattern, since such movement may be realized without mechanical moving parts. Of course, it is possible to move the object (such as for example in applications where objects moving on a conveyor belt are measured by the proposed area scanning confocal microscope) or combine the object movement with movement of the line pattern.

To realize a tilted focal (imaging) plane various approaches may be employed. For example, it is possible to use monochromatic light and spatial encoding, for example by using different projection angles for each line of the projected line pattern, such that each of the lines is imaged or focused at a different position along the optical axis of the microscope, and thus at a different depth in the object space. In an example, it is possible to use monochromatic light in a Scheimpflug configuration. A planar illumination source (for example an illuminated DMD) may be tilted so that the normal to the light source forms an angle to the optical axis of the system. In this case, each of the lines of the illumination source has a different distance to the objective, thus leading to a tilted focal field. The tilting angle of the planar light source is determined by the Scheimpflug principle. The imaging sensor plane is tilted as well so that it remains conjugate to the light source.

In an example, a chromatic encoding is employed, which generally results in a simpler optical system that is easily adaptable. In this example, the line pattern (generated by the pattern generation unit) may be a spectrally coded line pattern, wherein each line corresponds to a different (central) wavelength or a different (generally narrow) wavelength band. The different wavelengths or different wavelength bands are projected (by the projection unit) at different positions along the optical axis of the microscope.

For example, the pattern projection unit may comprise a chromatic objective (which may be the microscope objective) with known, predefined wavelength dispersion in the object space and more specifically along the optical axis of the microscope. Different wavelengths are thus focused at different positions along the optical axis of the microscope and thus at different depths in the object space. The wavelength dispersion may be, however, achieved by other means, such as using spectrally dispersive optical elements, such as diffraction gratings, prisms, etc.

The two-dimensional image detector captures within one image frame an image of the projected spectrally coded line pattern, wherein different lines in the captured image correspond to or in other words address different positions along the optical axis of the microscope and thus different depths in the object space.

In an exemplary implementation, the wavelength difference (wavelength step) between two neighbouring spectrally coded (central) lines or peaks may be 0.2 to 0.5 nm, for more specifically about 0.36 nm. The range of addressable depths in the object space may be about 0.5 mm to 1.5 mm, more specifically about 1 mm. The wavelength step and/or the depth range are not limited to these values and may be selected depending on the specific application. Further for example, with a fixed wavelength step, more line pixels (e.g. more column pixels) may be used to achieve a larger depth range but with longer measurement time.

In an example, the tilted focal plane may be realized by temporal multiplexing, wherein within one image frame of the two-dimensional image detector different lines of the line pattern are successively captured. In particular, the different lines of the line pattern may be imaged successively at different spatial positions on the two-dimensional image detector. Thus, by employing time multiplexing within one image frame, a full image of the line pattern is captured by the two-dimensional image detector. In this case, the tilted focal plane or the tilted illumination/imaging plane are "synthetic" tilted focal plane or tilted illumination/imaging plane, realized by time multiplexing within one image frame.

When chromatic encoding is used in combination with time multiplexing, subsequent lines of the line pattern may be selected or "turned on" (for example by turning on respective columns or rows of a spatial light modulator) and detected by the image detector, while the wavelength is scanned or changed. This generates a synthetic focal plane (synthetic illumination/imaging field plane) which is tilted with respect to the plane normal to the optical axis (i.e. which is tilted with respect to the optical axis). The ratio between the scanning speed of the wavelength and the scanning speed of the selecting or "turning on" of the pattern lines determines the tilting angle of the focal plane. Preferably, the wavelength scanning is synchronized with the capturing of images by the image detector and/or the selecting or "turning on" of line patterns, as it will be explained in detail further below. By combination of wavelength scanning and wavelength selection or "turning on", it is possible to generate a large range of illumination fields, including tilted illumination fields.

By using time multiplexing, in particular in combination with chromatic encoding, the tilting angle can be easily changed, and the system can be easily adapted to different applications and different numerical apertures. Further, the complexity of the optical system and/or the aberrations may be reduced.

In an example, the generating of the line pattern comprises changing the wavelength of a spectrally tunable light source and/or filtering a selected wavelength from the light emitted from a light source. For example, the pattern generation unit may comprise a (programmable) spectrally tunable light source and/or a spatial light modulator that may be used to spatially filter or select a specific wavelength from the light spectrum generated by the light source and project it (preferably together with our optical elements of the projection unit) onto the object. The spatial light modulator may be for example a digital mirror device, a liquid crystal spatial light modulator or any other spatial light modulator operating in a reflection or transmission mode. The spatial light modulator may be regarded as a secondary extended light source. By use of a spatial light modulator or a combination of spatial light modulators and/or a spectrally tunable light source, it is possible to realize a system that is easily adaptable to the specific measurement task.

In an example, the spatial light modulator (as an example of a secondary light source) and the image detector may be arranged in a Scheimpflug configuration. This may reduce the image aberrations and the necessity of complex post-processing steps and improve the accuracy of measurement.

The requirement for high tilting angle may have as a consequence that the effective measurement area is relatively small compared to the illumination/imaging field (by a factor cot(tilting angle) dependent on the tilting angle). To enlarge the effective measurement area, multiple periods of tilted focal plane or in other words tilted illuminating/imaging field that are simultaneously projected onto the object may be employed. This considerably increases the measurement speed.

Thus, in an example, the generating of the line pattern may comprise generating multiple periods or groups of the line illumination pattern. The projecting of the line pattern comprises projecting the multiple periods of the line illumination pattern into corresponding multiple tilted focal planes. The multiple tilted focal planes, each of them corresponding to one period of the illumination pattern may be parallel to each other. The capturing step comprised capturing, within one image frame, an image of the multiple periods of the line illumination pattern projected onto the object.

The pattern generation unit may be configured to generate multiple periods of the line illumination pattern that are projected or imaged by the projection unit into corresponding multiple tilted focal planes. Accordingly, within one image frame multiple periods of the line illumination pattern are captured by the image detector.

The method and microscope according to various aspects of the invention enable very fast 3D microscopic measurement. In implementations the proposed direct area scanning may be more than 300 times faster than a conventional array scanning mode of the same setup. This makes the system suitable for many applications in research and industry, including but not limited to surface inspection, inspection of parts (such as machined parts) on a production line, etc.

A drawback of the proposed method and microscope might be seen in the widening of the axial response as compared to normal confocal scanning. This is considered, however, to be a necessary sacrifice for the higher scanning speed. In the lateral direction, the resolution is also reduced compared to a single point confocal system, but only slightly. Another disadvantage caused by the requirement of the high tilting angle may be that the effective measurement area is relatively small compared to the illumination/imaging field (by a factor depending on the tilting angle). However, this disadvantage can be easily overcome by applying multiple periods of tilted illumination/imaging field, for example through the use of spatial light modulators (e.g. a DMD device).

The above and other objects, features and advantages of the present invention will become apparent from the following description of preferred embodiments given in conjunction with the accompanying drawings, in which:

FIGS. 1A to 1C show schematically three types of microscopes, wherein FIG. 1A shows a scanning type microscope, which is equivalent to a conventional wide-field microscope, FIG. 1B shows a confocal microscope and FIG. 1C shows a scanning microscope with tilted illumination field;

FIG. 13 shows the histogram of the fitting result for a.

Figure 2B:
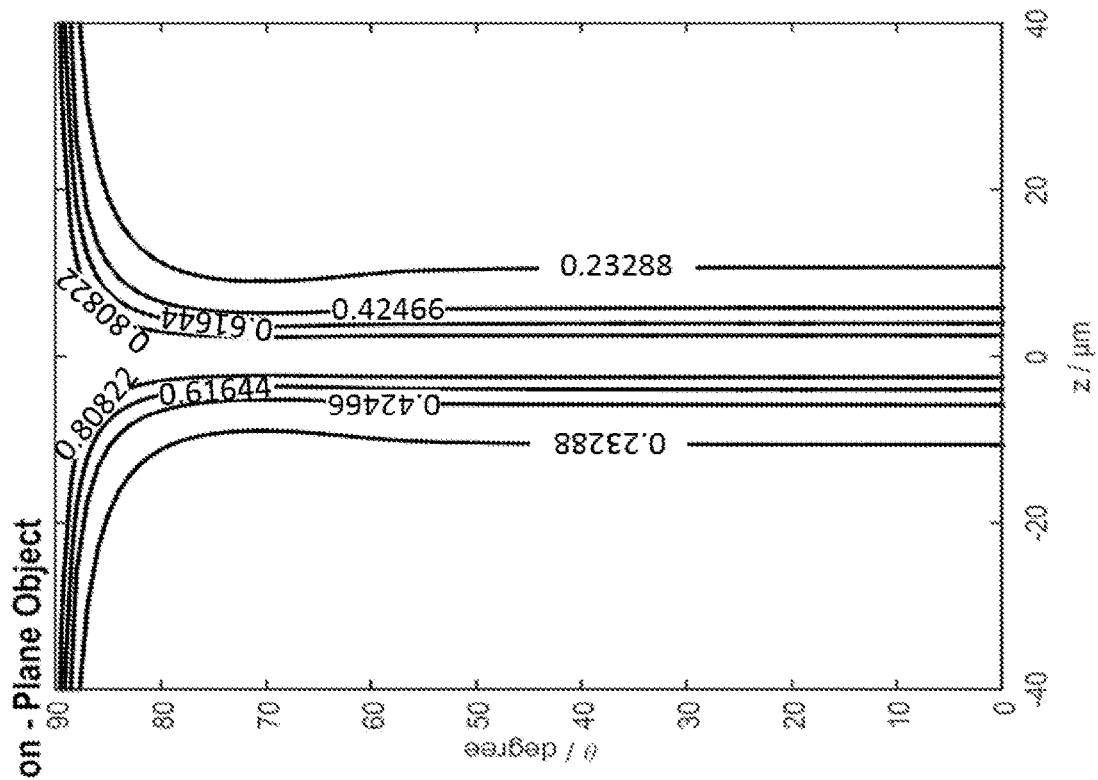
FIGS. 2A and 2B show simulation results for tilted slit illumination.

As explained above, direct area confocal measurement is generally considered impossible due to fundamental limitations of illumination and imaging. This has been partly circumvented by spectrally encoded slit confocal microscope, where one lateral axis is tackled with a physical slit and the orthogonal lateral axis is covered by lateral dispersion of the slit. In the following, an alternative approach for direct area confocal measurement based on a completely different principle is presented.

All confocal systems rely on the same principle that unfocused illumination light gets spread to adjacent areas. The reflected light is further filtered by the confocal pinhole, whether it's a physical pinhole, a fiber end or a single pixel, which finally generates the confocal peak in the detected signal.

FIGS. 1A to 1C illustrate three different types of microscopes in reflective configuration, where the illumination arm and detection arm share the same optical system due to the beam splitter. In FIG. 1 x and y represent the lateral directions and z represent the axial direction (which is generally parallel to the optical axis of the microscope).

FIG. 1A shows a type 1a scanning microscope, where wide-field illumination is projected onto the object 50 and a vanishingly small pinhole is applied before the detector. In other words, the microscope shown in FIG. 1A exhibits a wide-field imaging setup in an epitaxial configuration, wherein the focal plane (FP) is parallel to the x-y plane (and normal to the z axis. This has been shown to be equivalent to a conventional wide field microscope. The intensity response of such a system to a point object can be expressed as:

$$I(u,v)=|h(u,v)|^2 \quad (1)$$

where h(u,v) h(u,v) stands for the amplitude point spread function of the optical system with respect to the optical coordinates:

$$v=kr \sin \alpha = k\sqrt{x^2+y^2} \sin \alpha$$

$$u=4k\delta z \sin^2 \alpha/2$$

In these equations, k represents the wave number, $\sin \alpha$ is the numerical aperture and $\delta z$ represents a small axial deviation from the focal plane. For 3D measurement, the more important factor is the integrated axial response of the system to a planar object, which can be written as $$I_{int}(u)=2\pi\int_{-\infty}^{\infty} I(u,v)vdv \quad (2)$$

Although it has been proven that a slit can be used in a confocal system instead of a pinhole with only slightly widened confocal peak, it is apparent that a direct area confocal measurement is not possible using a microscope of type 1a. Theoretically, it has been proven with Parseval's theorem that the integral intensity response in Eq. 2 does not fall off with respect to u. This can equally be argued with conservation of energy. When a wide-field illumination is applied to a planar object, all light is reflected and therefore the intensity response remains constant as the object is scanned axially. Consequently, such a system does not possess the capability of depth discerning.

On the contrary, for a single-point confocal system illustrated in FIG. 1B, the intensity response of a point object is given by $$I(u,v)=|h(u,v)|^4 \quad (3)$$

The integral intensity response in the focal region can be written as $$I_{int}(u)=2\pi\int_{-\infty}^{\infty}(C^2(u,v)+S^2(u,v))^2 v dv \quad (4)$$

in which C(u,v) and S(u,v) are defined as:

$$C(u,v)=\int_{-\infty}^{\infty} 2\cos\left(\frac{1}{2}ju\rho^2\right)J_0(v\rho)\rho d\rho$$

$$S(u,v)=\int_{-\infty}^{\infty} 2\sin\left(\frac{1}{2}ju\rho^2\right)J_0(v\rho)\rho d\rho$$

with $J_n$ being a Bessel function of first kind of order n.

The integral intensity response can be evaluated numerically, which demonstrates that the intensity drops as the object moves away from the focal plane. Such phenomenon serves as the basis for the depth discerning capability of confocal systems.

FIG. 1C shows a microscope or microscopic system similar to a type 1a scanning microscope illustrated in FIG. 1A. The only difference is that the focal plane of the optical system is rotated with respect to the x-y plane (i.e. rotated with respect to an initial position in which it lies inside the x-y plane), wherein the rotation is made with the y-axis as the rotation axis. More specifically, the focal plane, i.e. the plane in which the focal points formed by the illumination light lie, is not parallel to the x-y plane (i.e. a plane normal to the optical axis z) as in FIG. 1A but is rotated or tilted at an angle with respect to the x-y plane, as shown in FIG. 1C. In the following, such focal plane/field will be referred to as "tilted focal plane/field" or "tilted illumination". The tilting angle can be selected depending on the numerical aperture NA of the microscope. For example, the tilting angle for a numerical aperture NA=0.33 may be between 65° and 85°, preferably around 75°. For NA=0.5, the tilting angle may be between 50° and 85°, preferably around 55°. As NA becomes larger, a larger angular working distance is allowed.

The high tilting angle of the focus plane/field or, respectively, the high tilting angle of the illumination and imaging field is important for the present invention, since the axial response to a planar area object is only observed when the tilting angle is sufficiently high (for NA=0.33, around 65° to 85°). Several approaches may be used to generate such a large tilting angle. Exemplary approaches will be described in more detail below.

In general, the optical system of an area scanning confocal microscope as shown in FIG. 1C can be treated as a black box which is capable to generating a tilted focal plane/field. Since such configuration breaks the radial symmetry of the system, Cartesian coordinates are used instead of the optical coordinates. The intensity response of the system can be expressed as:

$$I(x,y,z)=\iiint_{-\infty}^{\infty} H(x-x',y-y',z-z')H(x,y,z-z')M(x',y',z') dx'dy'dz' \quad (5)$$

where H(x,y,z) is the intensity point spread function of the optical system and M(x,y,z) is a mask function defined as:

$$M(x,y,z)=\begin{cases} 1 & \text{if } (x,y,z) \text{ is on the focal plane} \\ 0 & \text{otherwise} \end{cases} \quad (6)$$

With the on-axis focal point position defined as (0, 0, 0) and the angle between the focal (illumination) plane and x-axis denoted as θ. The above expression can be rewritten as:

$$I_\theta(x,y,z)=\iint_{-\infty}^{\infty} H(x-x',y-y',z-x'\cdot\tan\theta)H(x,y,z-x'\cdot\tan\theta)dx'dy' \quad (7)$$

The corresponding integral intensity response can be expressed as:

$$I_{int}(z)=\iint_{-\infty}^{\infty} I(x,y,z)dx,dy \quad (8)$$

This expression does not have an analytical solution and is evaluated numerically.

Numerical Simulation Results

Equations 7 and 8 are evaluated through numerical simulation to investigate the corresponding depth discerning capability for a 3D measurement. The intensity point spread function H(x,y,z) is simulated based on a fast 3D PSF model for a volume of 80 μm×80 μm×150 μm. The numerical integration is implemented afterwards. A numerical aperture NA of 0.33 is utilized and a wavelength of 580 nm is specified.

Figure 2A:
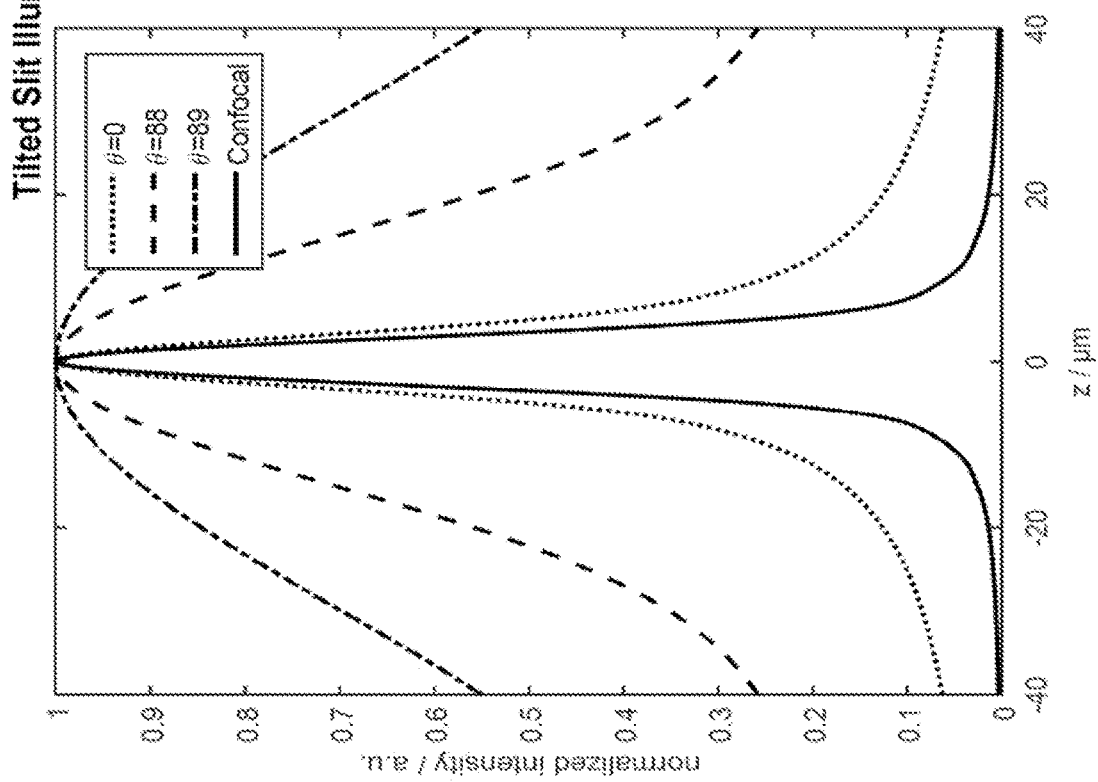

FIGS. 2A and 2B show the results of the numerical simulation in case of a tilted focal field under slit illumination. In this case, a slit along x-axis is applied to the light source generating a tilted line of focused illumination, which forms an angle of θ with respect to x-axis. The integral intensity response of such a configuration is simulated and illustrated in FIGS. 2A and 2B, wherein for each angle θ, the intensity response is normalized so that the maximum intensity equals to one. FIG. 2A shows the normalized intensity (in arbitrary units) as a function of the z-coordinate (in μm). FIG. 2B is a contour plot of the normalized intensity (in arbitrary units) as a function of the tilting angle θ and the z-coordinate (in μm). The solid line curve on the left (FIG. 2A) represents the integral intensity response of a conventional single point confocal microscope to a plane object. As can be seen from the simulation result, for most of the angles, the system remains capable of depth discerning, although the width of the intensity is slightly broadened. It is worth noting that at 0°, the system is exactly a conventional slit scanning confocal system, whereas at 90°, the system becomes a special (unphysical) confocal system with a focal point infinitely elongated along the optical axis. Alternatively, it can be seen as a single point chromatic confocal system, with a detector not capable of wavelength discerning. Therefore, as the angle approaches 90°, the intensity response becomes more flat and the system gradually loses its depth discerning capability.

Figure 3B:
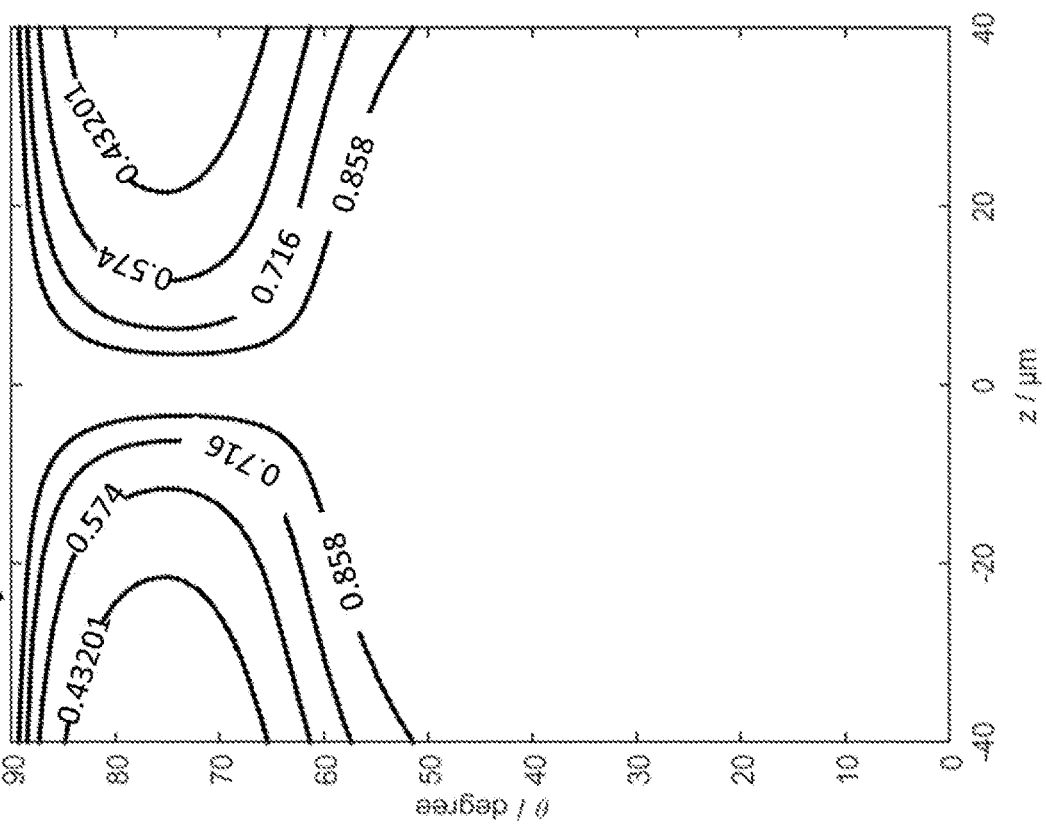
FIGS. 3A and 3B show simulation results for tilted slit illumination.
Figure 3A:
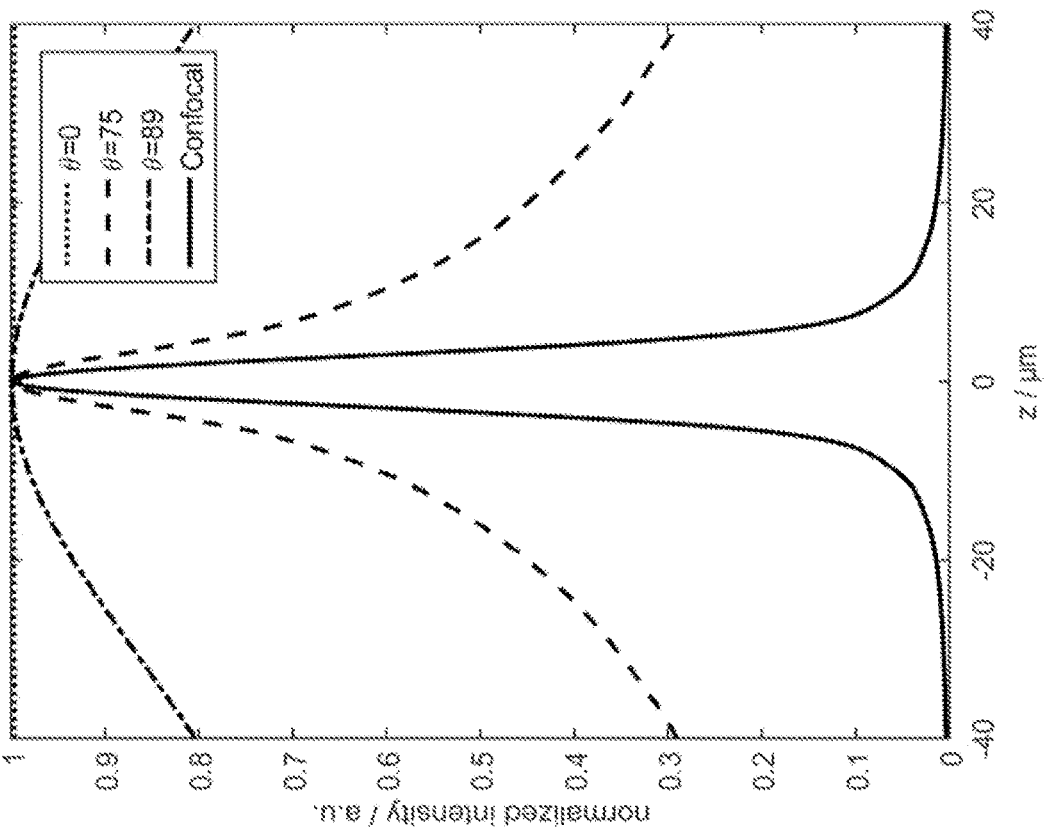

FIGS. 3A and 3B show simulation results in case where a complete planar light source is used to generate a tilted planar illumination field. FIG. 3A shows the normalized intensity (in arbitrary units) as a function of the z-coordinate (in μm). FIG. 3B is a contour plot of the normalized intensity (in arbitrary units) as a function of the tilting angle θ and the z-coordinate (in μm). As shown by results illustrated in FIG. 3, at 0°, the system represents a type 1a scanning microscope equivalent to a wide-field microscope, which is not capable of depth discerning. At 90°, the system can be treated as an array of chromatic confocal point sensors with monochromatic detector or simply as a chromatic confocal slit scanning system with monochromatic detector. Since the detector is a monochromatic camera without depth discerning, the system is also not applicable to 3D measurement. Thus, both the case of 0° and the case of 90° represent a system which is not capable of 3D measurement. However, it was surprisingly found out that as the angle varies between 0° and 90° where the intensity becomes concentrated around the focus, leading to capability of depth discerning. More specifically, as seen from FIG. 3, an intensity peak is clearly visible around roughly 75°, indicating the capability of depth discerning. The full width at half maximum (FWHM) of the conventional confocal intensity peak is roughly 7 μm and the FWHM of the peak at 75° is roughly 32 μm. Although the intensity peak is several times wider than a conventional confocal peak, this sacrifice leads to an imaging system capable of true area confocal scanning.

For other numerical aperture the optimum range of angle might differ, but for typical numerical apertures employed in microscopy an angle greater than 30° and smaller than 85° is needed to have a reasonably concentrated peak for 3D measurement.

Figure 4B:
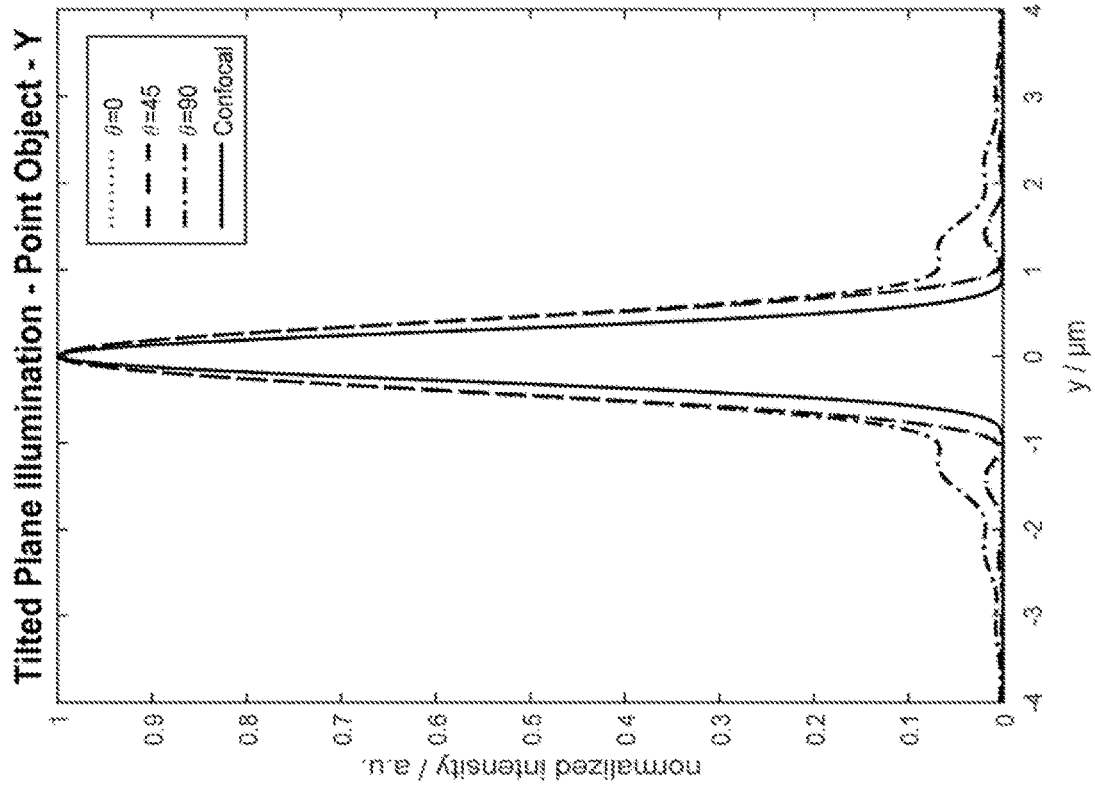
FIGS. 4A and 4B show the intensity response of a point object with lilted plane illumination.
Figure 4A:
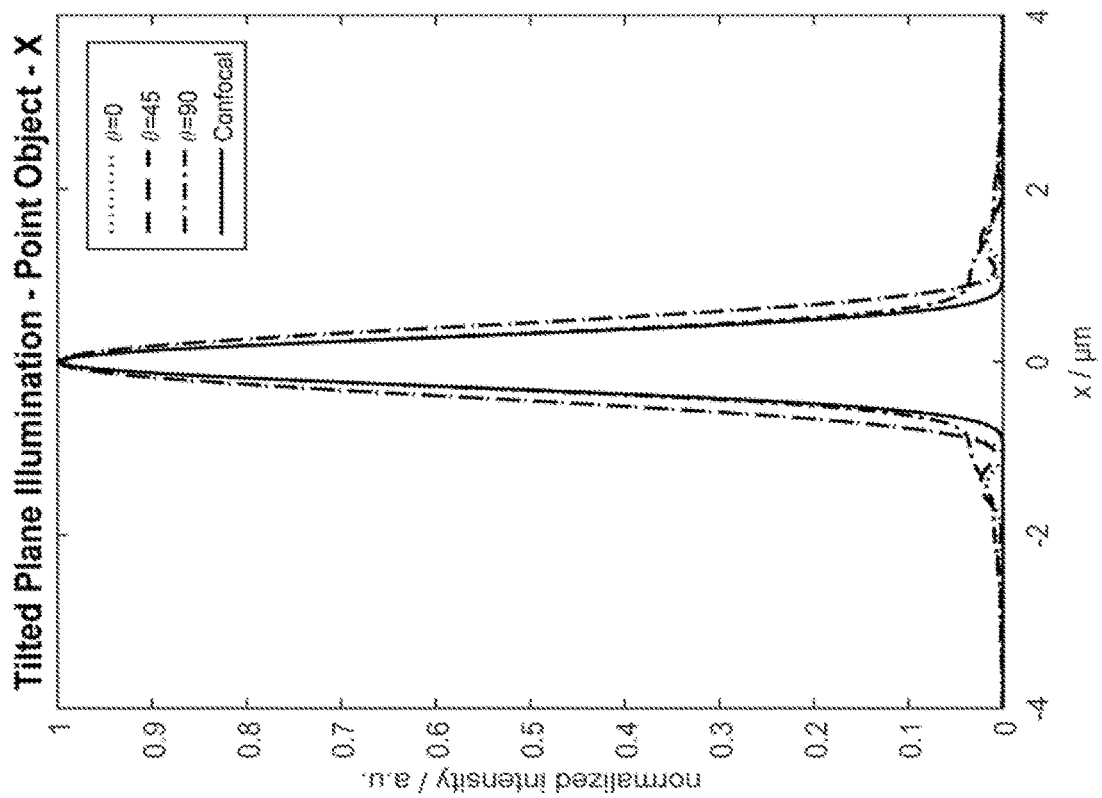

FIGS. 4A and 4B show the intensity response of the proposed system when a point object is scanned laterally, wherein FIG. 4A shows the normalized intensity (in arbitrary units) as a function of the x-coordinate (in μm) and FIG. 4B shows the normalized intensity (in arbitrary units) as a function of the y-coordinate (in μm). The intensity response is simulated by calculating $I_\theta(x,y,z)$ in Eq. 7 through numerical integration. In the y-direction, since the plane of illumination is tilted with respect to the y-axis, the response is very similar to that of a slit scanning confocal microscope in the direction parallel to the slit. In the x-direction, the width of the intensity response is less affected by the area illumination but is more sensitive to the change of the tilting angle. In both cases, the FWHM of the signals are only slightly wider than a conventional confocal signal, indicating a good lateral resolution very similar to a conventional confocal system.

Figure 5:
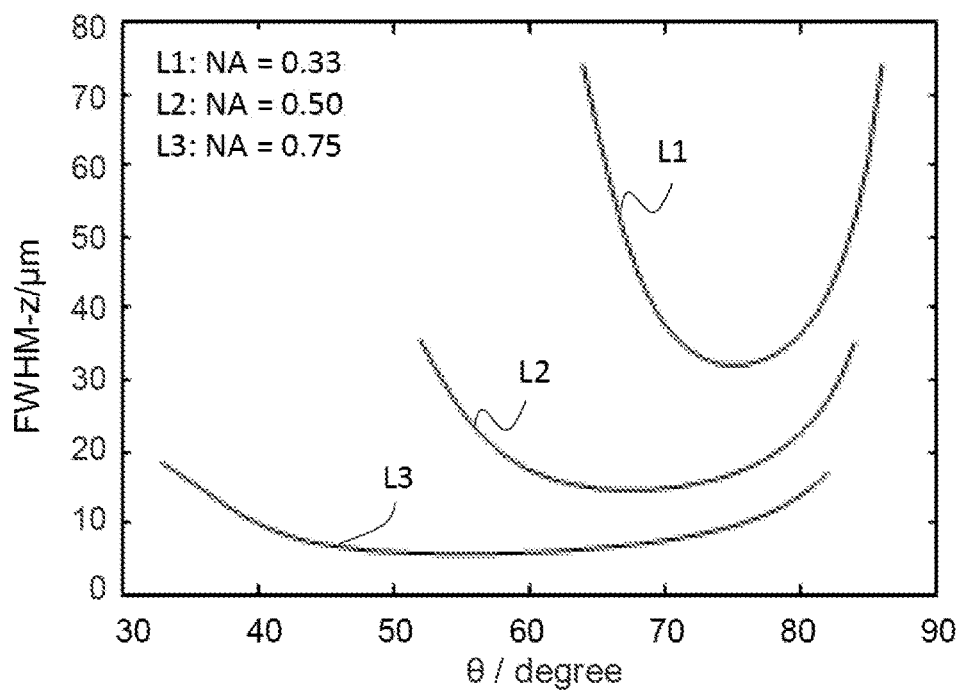
FIG. 5 shows an axial FWHM of the intensity response with respect to the numerical aperture NA and the tilting angle $\theta$.

Based on simulation results illustrated in FIG. 3, the axial full-width-half-maximum (FWHM) for the intensity response can be calculated. FIG. 5 shows the change of axial FWHM with respect to the tilting angle for three different NAs. Similar to a conventional confocal scanning system, the effective axial FWHM is reduced as the NA is increased. Additionally, a larger NA allows for a larger operational tilting angle range, which moves toward lower tilting angle. Consequently, the optimum tilting angle for minimum FWHM is also reduced as the NA increases. For an NA of 0.33, which will be utilized in the experimental setup, the optimum tilting angle is approximately 75°.

Generation of Tilted Focal Plane/Field

Figure 6A:
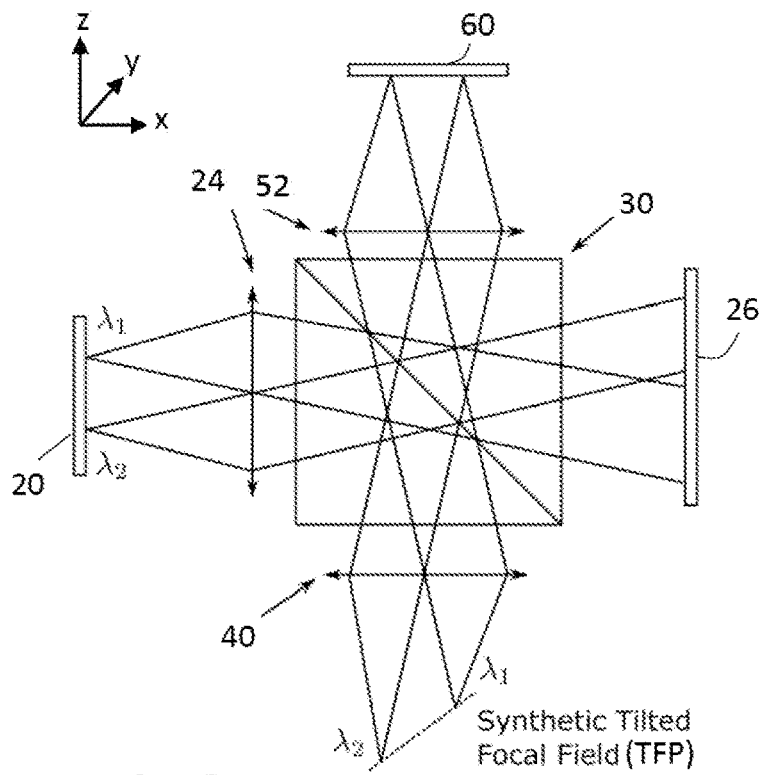
FIGS. 6A and 6B show schematic optical setups of two exemplary area scanning confocal microscopes with tilted confocal scanning.
Figure 6B:
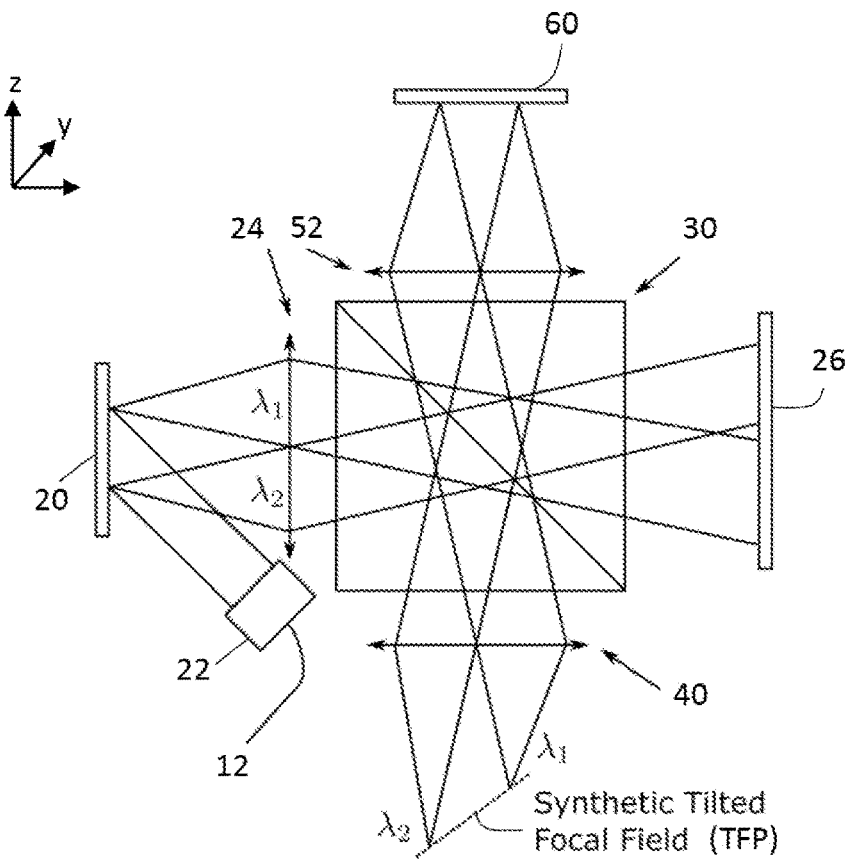

FIGS. 6A and 6B show exemplary implementations of an area scanning confocal microscope with tilted focal plane.

Figure 7A:
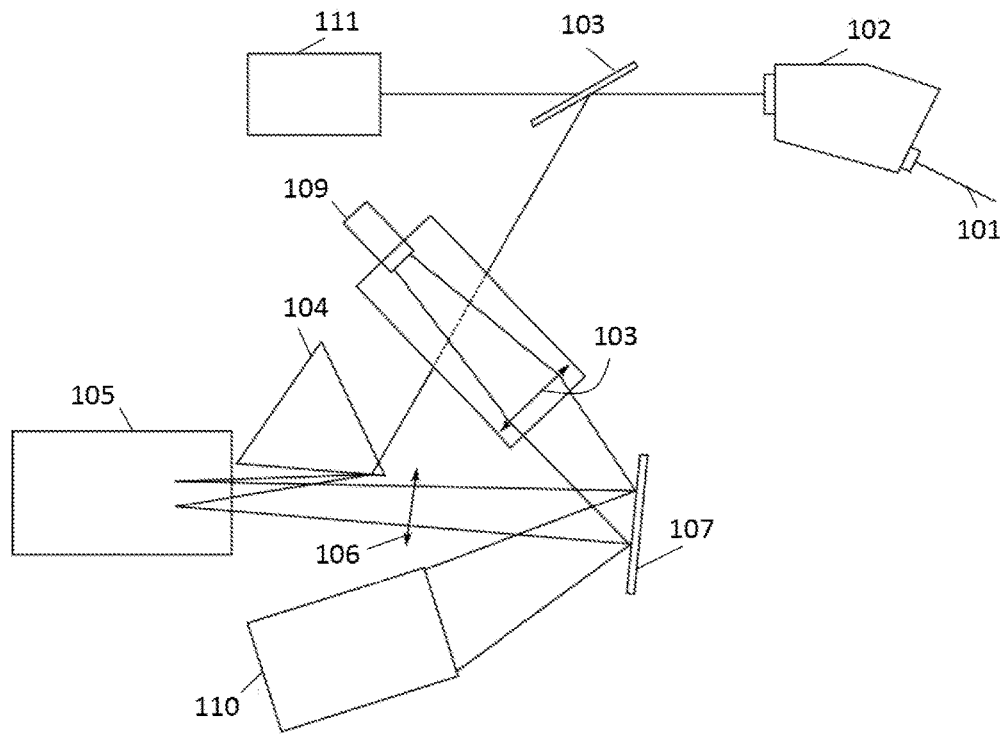
FIG. 7A shows the schematic optical setup of an exemplary spectrally tunable programmable light source.

As shown in FIGS. 6A and 6B, polychromatic (multispectral) light is first projected onto a digital mirror device (DMD) 20 (as an example of a spatial light modulator). The digital mirror device 20 will be also referred to in the following as "spatial DMD". The multispectral light may be generated for example by a spectrally tunable polychromatic light source, as shown in FIG. 7A and transported via a light guide 12. The light beam emerging from the light guide 12 may be expanded and homogenized by a homogenized projector 22, as shown in FIG. 6B.

Each mirror on the DMD 20 may be considered as a secondary point light source, which is projected onto the object through an achromatic objective 24 (e.g. a tube lens), a beam splitter 30 and a chromatic objective 40 with designed chromatic separation along the optical axis z. A tilted focal plane/field TFP (or a tilted illumination/imaging plane/field) in the object space can be realized through a temporal multiplexing, where within each frame of exposure (i.e. within each image frame captured by the camera 60), subsequent lines of pixels of the DMD device 20 are turned on while the wavelength of a spectrally tunable light source is scanned. This generates a synthetic illumination/imaging field plane or in other words, a synthetic focal plane which is tilted with respect to the plane normal to the optical axis z. The ratio between the scanning speed of the wavelength and the scanning speed of the DMD pixel line determines the tilting angle of the focal plane/field or illumination/imaging field, respectively.

According to the coordinate system shown in FIG. 1, the one-dimensional scanning direction can be chosen arbitrarily as long as it is not parallel with the illumination/imaging field. The two most common directions will be along the z-axis or along the x-axis. In the implementation shown in FIGS. 6A and 6B, a scanning along the x-axis can be easily conducted through a control of the DMD 20 so that no macro-mechanical scanning is needed for a complete 3D measurement. Such scanning generates a measurement volume in the shape of a rectangular cuboid, which is comparable to conventional confocal scanning systems. In other possible implementations, mechanical scanning (e.g. by moving the object in the scanning direction) might be necessary, but only for one axis (x or z). Such behavior makes this invention fundamentally different from other array scanning microscopes using Nipkow disks or slit where two-dimensional scanning is required when chromatic separation is not incorporated.

As illustrated in FIGS. 6A and 6B, the optical system of the exemplary an area scanning confocal microscope is composed of two major sub-systems: a light source with a tunable spectrum and a chromatic confocal setup with area illumination and detection.

Polychromatic Light Source

FIG. 7A shows an exemplary light source 10 that may be used in the optical setup shown in FIGS. 6A and 6B that uses chromatic encoding. Preferably, a programmable light source, which is capable of generating arbitrary spectrum with very fast speed is employed, such as for example the light source shown in FIG. 7A.

The light source 10 is a programmable light source. The light source comprises a laser 101 that emits broadband light, for example a supercontinuum laser (such as SuperK EXTREME EXW-12 from NKT Photonics). The light beam emitted from the laser 101 is expanded by a beam expander 102 and directed via a mirror 103 (e.g. a VIS reflective mirror) to a cross disperser pair formed by a dispersion prism 104 in horizontal orientation and an echelle grating 105 in vertical orientation. The cross disperser pair may be used to generate a two dimensional dispersion distribution of the light emitted from the supercontinuum laser 101, which is projected by a projection lens 106 on a programmable spatial light modulator 107. The spatial light modulator 107 may be a DMD (such as DLP LightCrafter 6500 EVM from Texas Instruments). The spatial light modulator 107 is used to spatially filter the dispersion pattern, thus generating light of the desired spectrum, which is collected via collection lens 108 into a liquid light guide 109 (which may be the same as light guide 12) for illumination in the microscope system. The DMD 107 included in the light source 10 will be also referred in the following as "spectral DMD" to distinguish it from the DMD 20 included in the body of the area scanning confocal microscope. The wavelength range employed by the system may be for example from 480 nm to 680 nm. Other wavelength ranges are possible. The light source 10 comprises also beam traps 110 and 111.

The above described polychromatic, spectrally tunable light source 10 is only one exemplary polychromatic light source. Other polychromatic light sources may be employed instead, such as for example an array of switchable lasers or light emitting diodes (LED), polychromatic sources employing other dispersive elements and/or other spatial light modulators (in transmissive or reflective mode of operation).

Optical Setup

The optical setup of the exemplary area scanning confocal microscope shown in FIGS. 6A and 6B resembles the optical arrangement of a conventional reflective confocal scanning microscope, except that a DMD 20 is used as a programmable extended light source and a camera 60 (a two-dimensional image sensor) is used to capture and measure all lateral locations simultaneously, i.e. within one image frame. Instead of DMD other spatial light modulators (in reflection or transmissive modes) may be used.

The light transported through the light guide 12 or 109 from the spectrally tunable light source (such as the programmable light source 10 shown in FIG. 7A) is first collimated and preferably homogenized by a homogenized projector 22. The homogenized projector 22 may for example comprise an aspheric condenser lens (e.g. ACL5040U from Thorlabs) that collimates the light from the spectrally tunable light source emerging from the light guide. The collimated light is then homogenized through a pair of microlens arrays comprised in the homogenized projector (e.g. #63-230 from Edmund Optics) and projected into a rectangular illumination field using an achromatic doublet comprised in the homogenized projector. The specifications of the condenser lens, the microlens arrays and the achromatic doublet may be chosen in combination according to the output diameter and the numerical aperture NA of the light guide 12, so that the resulting rectangular illumination field is only slightly larger than the effective area of the DMD 20, thus fully utilizing the power of the spectrally tunable (programmable) light source.

The DMD 20 used in the microscopic setup shown in FIGS. 6A and 6B may be the same type as the DMD 107 employed in the spectrally tunable light source 10. Each pixel of the DMD 20 acts as a secondary point source which can be programmably addressed. After passing through an achromatic objective 22 and being reflected by the beam-splitter 30 (e.g. a pellicle beam splitter such as BP245B1 from Thorlabs), light from selected pixels of the DMD 20 (e.g. a line of pixels) is projected onto the target object using a chromatic objective lens 40 with designed or predetermined chromatic separation along the optical axis z (e.g. Precitec CLS4). The reflected light passes through the chromatic objective 40 once again and gets focused through an achromatic objective 52 (e.g. a tube lens) onto a camera (a two-dimensional detector) 60. The camera 60 may be a sCMOS camera (e.g. Andor Zyla 5.5). The camera may be a monochromatic camera (i.e. need not have spectral selection capability). The microscopic setup shown in FIGS. 6A and 6B may further comprise a beam trap 26 to absorb light reflected by the beam splitter 30 that is not used for measurement.

Figure 8:
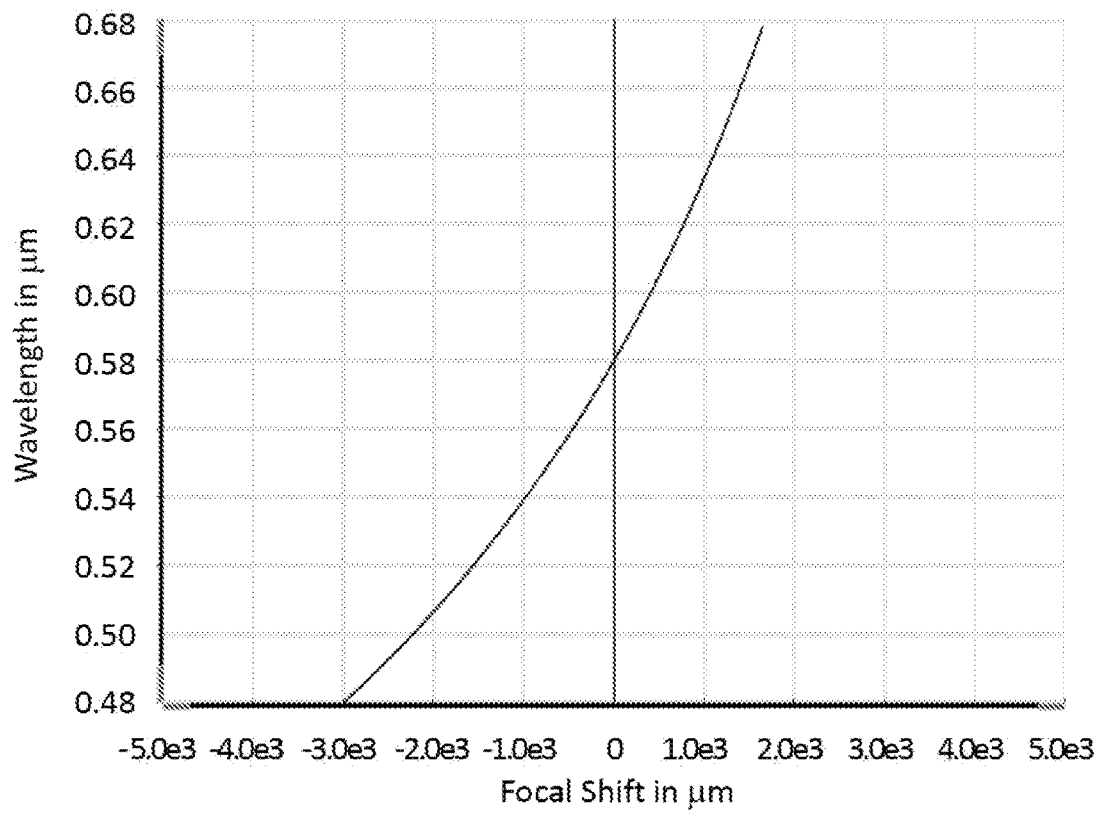
FIG. 8 shows an axial chromatic shift in the object space.
Figure 7B:
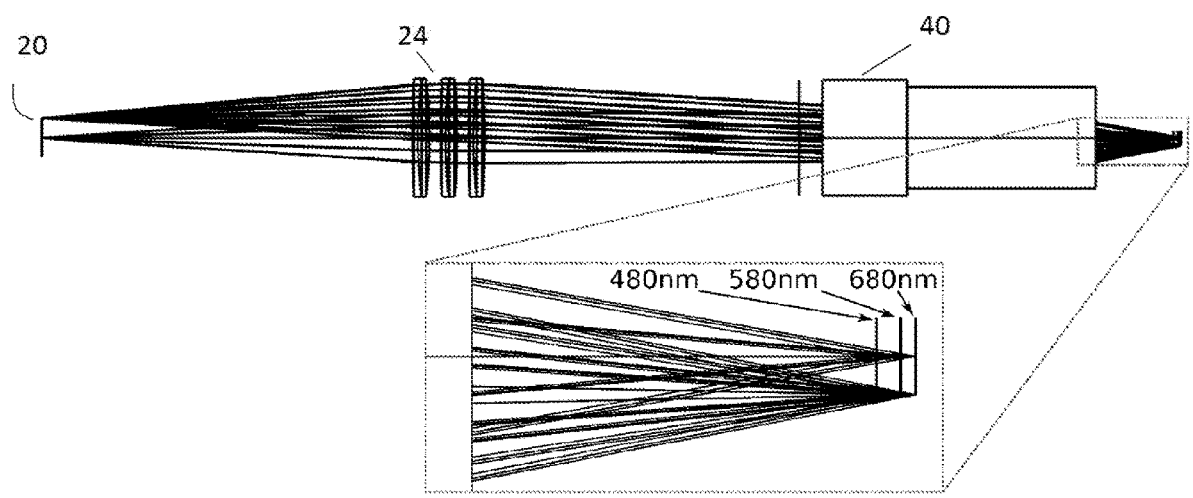
FIG. 7B shows schematically the illumination arm of an exemplary area scanning confocal microscope.

FIG. 7B shows schematically the illumination arm of the exemplary area scanning confocal microscope, wherein the wavelength range is between 480 nm and 680 nm. As shown in FIG. 7B, a group of three achromatic doublets may be a chosen to form an infinity-corrected tube lens 24 achromatic objective), which matches the field of view and aperture of the chromatic objective 40 with the effective area of the DMD 20 as well as the illumination numerical aperture NA. Depending on the design of the chromatic objective 40, the axial focus shift may be slightly non-linear, as shown in FIG. 8. The non-linear chromatic shift can be easily corrected through experimental calibration and postprocessing. A further aberration may be a field curvature due to the introduction of the simple tube lens 24. Typically, this aberration is at a manageable level and may be also corrected through the use of suitably corrected achromatic objectives and/or by calibration and postprocessing. Apart from these aberrations, the combination of the tube lens 24 and the chromatic objective 60 generates diffraction limited illumination spot in the object space for all wavelengths at their corresponding focal plane.

The imaging arm of the exemplary area scanning confocal microscope may be the same as the illumination arm with an achromatic objective 52 (e.g. a tube lens) placed before the camera 60. The achromatic objective 52 may be the same as the achromatic objective 24 employed in the illumination arm. The camera 60 is located at the conjugate location of the DMD 20. In other words, the sensor plane of the camera 60 is conjugate to the plane in which the elements of the DMD 20 are located. When a mirror is placed at the illumination focal plane of each wavelength, diffraction-limited focus points are achieved at the sensor plane (image detection plane) of the camera 60. In the system shown in FIG. 6, the airy disks for wavelengths of 480 nm, 580 nm and 680 nm have diameters of 4.5 µm, 5.4 µm and 6.4 µm respectively, which matches the pixel size of 6.5 µm in the camera sensor. The three-dimensional measurement volume is roughly 5.4 mm (x) by 3 mm (y) by 4.67 mm (z). Generally, it is not necessary that the size of the airy disk matches the pixel size. It is possible to image one diffraction limited focus points to a group of pixels.

As demonstrated by the simulation results presented above, the depth discerning capability of the area scanning confocal microscope with titled focal plane is only maintained in a relatively small range of angles equal to or greater than 50° and smaller than 50°, typically from about 65° to about 85°, for example around 75° (depending on the numerical aperture). Through optical design, for example utilizing a Scheimpflug configuration of the DMD 20 and the camera 60 (more specifically of the plane in which the DMD elements are located and the sensor plane of the camera), the imaging quality may be improved. Nevertheless, since the imaging quality could be easily affected, preferably the tilted focal field is implemented through multiplexed chromatic encoding, as shown for example in FIGS. 6A and 6B. Since the illumination spectrum can be tuned, for example through a first spatial light modulator (such as DMD 107) comprised in the programmable light source and the lateral locations can also be arbitrarily addressed through the second spatial light modulator (e.g. a DMD 20) comprised in the body of the confocal microscope, the combination of the two spatial light modulators (such as two DMDs) allows the generation of illumination anywhere within the three-dimensional measurement volume. Through time multiplexing, within each frame of camera exposure, several pairs of patterns are displayed by the two DMDs, forming a series of localized illumination distributions in the target space. By controlling the two DMDs simultaneously, it is possible to generate any 3D illumination field, including the required tilted planar illumination field.

Illumination

In an embodiment, the programmable light source generates a series of spectral Gaussian peaks of equal intensity with a FWHM of 1 nm. Each spectral peak corresponds to one column of lateral DMD pixels of the DMD device 20. Adjacent columns of the DMD device 20 (which for example extend in y-direction) correspond to different wavelengths. In general, n-columns of the DMD device correspond to n different spectral peaks with n-different wavelengths:

Column #1: wavelength $\lambda_1$;
Column #2: wavelength $\lambda_2$;
. . .
Column #n: wavelength $\lambda_n$;

The tilting angle of the illumination plane (or respectively focal plane) can be calculated through the following expression:

$$\theta = \arctan\left(\frac{\Delta\lambda \times CA}{p \times M}\right)$$

where $\Delta\lambda$ denotes the wavelength step between adjacent spectral peaks or in other words, between adjacent (central) wavelengths, M denotes the magnification of the system, CA denotes the axial chromatic aberration which can be expressed as $CA=\delta z/\delta\lambda$ and p denotes the physical pitch of the lateral DMD pixel of the DMD device 20. In an exemplary setup having configuration shown for example in FIGS. 6A and 6B, the magnification is 0.37 and the physical pitch 7.56 µm. For example, at a wavelength of 530 nm, the CA is approximately 29.13 µm/nm, to generate a tilting angle of 75°, a wavelength step of 0.36 nm is required between adjacent columns of pixels of the DMD device 20.

The above parameters and settings are only exemplary and other parameters and settings (such as magnifications, physical pitches, etc.) are possible. For example, instead of addressing columns, rows may be addressed. Further, it is generally possible to address any lines in the two-dimensional plane of the DMD device, so as to obtain a two-dimensional spectrally encoded line pattern.

Due to the nonlinear chromatic aberration, to maintain a linear axial spacing, the wavelength step between adjacent DMD pixel columns of the DMD device 20 preferably varies with the corresponding wavelength. Such implementation of tilted planar illumination differs from the idealized theoretical model presented above mainly in two aspects. Firstly, while in the model the illumination plane is continuous and extends in all dimensions to infinity, in practice it is apparent that such illumination is impossible and is approximated by a finite illumination plane composed of discrete illuminated locations. Secondly, the numerical aperture of different wavelengths varies slightly instead of remaining a constant value, which is assumed in the theoretical model. Despite these discrepancies, the theoretical model is considered a valid approximation to the practical setup.

Figure 9:
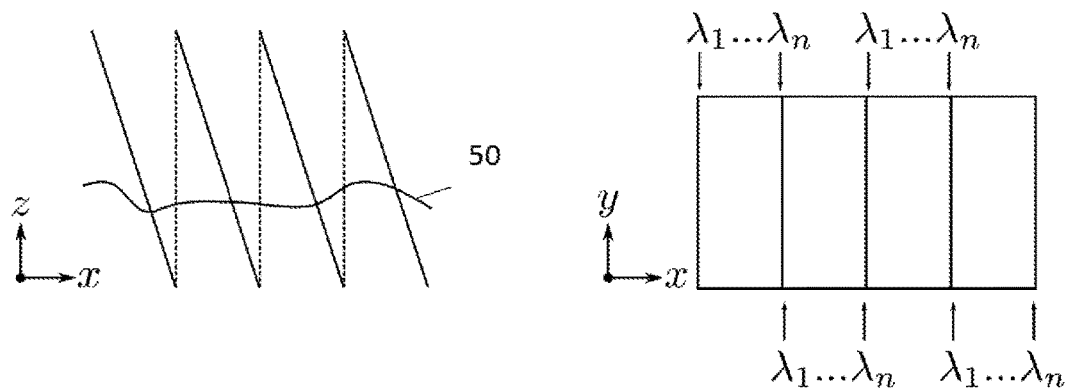
FIG. 9 shows an exemplary periodic planar object illumination.

Due to the large tilting angle, even for the full axial range (for example of about 4.67 mm), the effective lateral coverage of illumination in x direction is relatively small, for example only about 1.25 mm. This might be seen as a drawback of the proposed area scanning method with titled focal plane. Nevertheless, due to the adaptability of the proposed system, multiple periods of illumination planes can be easily configured, as illustrated in FIG. 9. Although the boundary area between two illumination periods may be susceptible to additional crosstalk, the adverse influence is well within an acceptable level.

Scanning Mechanism

Figure 10:
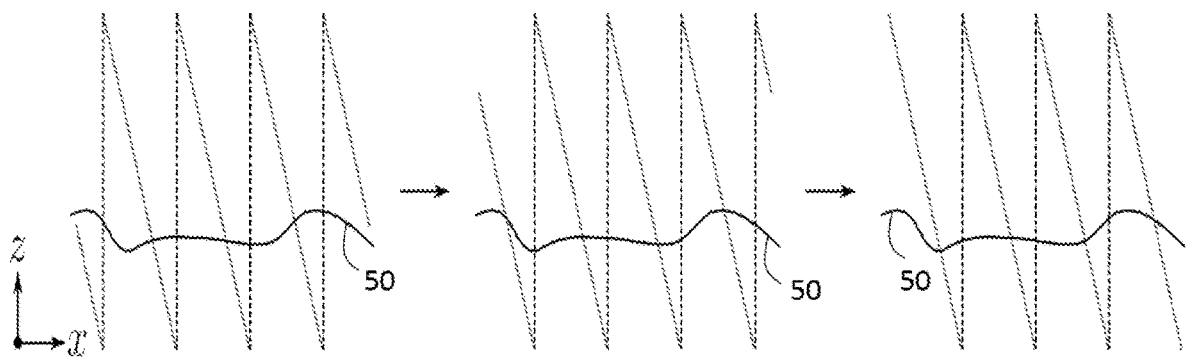
FIG. 10 shows an exemplary scanning course of the illumination field.

As explained above, the confocal scanning is preferably achieved through manipulation of the 3D illumination field based on the control of the two DMDs 20 and 107, while the camera records one image for each (tilted) illumination field. As the complete illumination is shifted axially upon scan, part of the illumination field which is out of the measurement volume is preferably wrapped in from the opposite side. For example, FIG. 10 shows the course of a possible scanning process. Since the tilting angle of the illumination field is much larger than 45°, it is more intuitive to consider that the illumination field is being scanned laterally along the x axis. In fact, due to the two-dimensional relative movement and the wrapping of the illumination field, scanning in the x direction is exactly equivalent to scanning in z direction. One additional benefit brought by such equivalency is its potential applicability on an assembly line, where one period of tilted illumination pattern can be fixed while the object is scanned along one lateral direction by the transporting system.

The total number of images can be adaptively tuned according to the axial measurement range and the discretization of the illumination field, which depends on the required accuracy of measurement. For example, if a series of 50 spectral peaks are utilized, which corresponds to 50 columns of pixels on the spatial DMD (i.e. the DMD 20 of the area scanning confocal microscope), a total of 50 images are required for a complete three-dimensional scan of the surface. By enlarging the FWHM of the spectral peak, the axial intensity response is effectively widened due to an overlapping of multiple shifted illumination planes. This reduces the axial resolution of the system but allows faster scanning, e.g. shifting of the 3D illumination by multiple pixel columns instead of one column. This property further enhances the adaptability of the measurement system.

Synchronization Mechanism

The camera 60 (for example a sCMOS camera) is preferably a camera with good signal to noise ratio and color depth (dynamic range). Preferably, a high-speed camera is employed, although it is not a prerequisite. To fully utilize the camera's potential, the camera may be applied as a master in a synchronization mechanism that triggers the spectral DMD 107, which then triggers the spatial DMD 20. Both DMDs may be for example empowered with a binary pattern rate of 9.5 kHz. Since the transmission of the patterns might be a bottleneck of the pattern generation speed, an on-board USB 1.1 interface may be utilized in the pattern-on-the-fly mode, allowing for accurate triggering between the various components.

Figure 11:
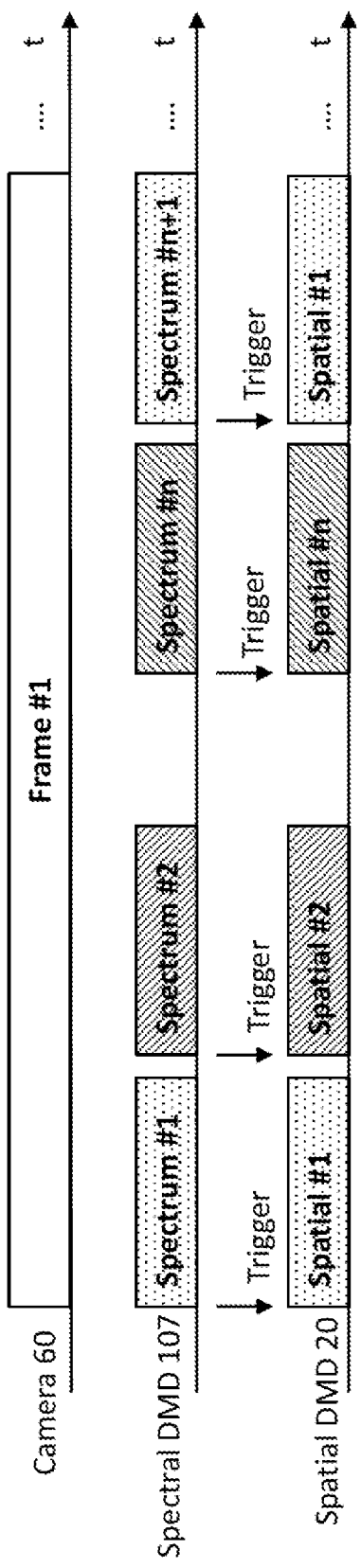
FIG. 11 shows an exemplary triggering diagram.

To avoid transmission of patterns to the DMD between camera frames, a special mechanism may be utilized by adding an additional black pattern for the spectral DMD at the end. As demonstrated by the triggering diagram shown in FIG. 11, at the beginning of each exposure, the camera sends a trigger signal to the spectral DMD, which starts a continuous series of n+1 patterns. Each of the first n spectral DMD patterns corresponds to illumination of a spectral peak and triggers its respective spatial pattern (e.g. a column or a row of DMD elements). The last spectral DMD pattern is completely black, which serves to send one additional trigger to the spatial DMD 20. Since the spatial DMD 20 is only loaded with n patterns, this additional trigger from the spectral DMD effectively shifts and wraps one spatial pattern till the end of the next exposure, i.e. the order of the spatial pixel columns is shifted by one pixel. The combined effects result in a shifted 3D periodic illumination field from frame to frame, as illustrated in FIG. 11. In this way, all patterns can be transferred to the DMDs off-line, and during the measurement, the camera can be operated in a continuous burst mode with its maximum speed.

Camera Calibration

An important aspect of an area scanning confocal microscope that may distinguish it from a conventional single point microscope is the requirement of calibration between the camera sensor 60 and the light source 10. Considering a near telecentric design of the system, the camera 60 may be calibrated for a single wavelength (for example of 555 nm), by placing a mirror at its focal plane. The registration may be made only between the camera coordinates and the DMD coordinates, while the registration toward the object/world coordinate system may be ignored at the moment. Therefore, all measurement results are laterally presented in the DMD coordinate system by first projecting the DMD coordinate system onto the camera frame and then making an interpolation.

The applicability of the proposed system and method for high speed 3D measurement was confirmed experimentally as described below.

In particular, the above described area scanning confocal microscope and scanning method were used to obtain 3D measurements of a small area on a two-Euro coin with the letters E and U. This area was chosen due to its complex structure. There are three major levels of height in this area. The bottom surface and the top surface of the letter face are both designed to be flat, whereas the middle surface of the European map has a wavy profile packed with small indentations. A wavelength range of 530 nm to 548 nm was utilized which corresponds to an approximate axial range of 501 µm.

Comparative Example: Conventional Array Scanning

The system was first operated in an array scanning mode, where the spatial DMD is programmed to generate a rectangular grid pattern. Although the system still offered usable result when the pitch is specified as ten pixels, the actual pitch was specified as twenty pixels to avoid any possible cross talk between adjacent measurement points. For each spatial pattern, 50 illumination spectra were utilized including one dark spectrum for background. The 49 illumination spectra are a series of Gaussian peaks with a FWHM of 1 nm whose center wavelengths are spaced nonlinearly to guarantee linear axial spacing. The total number of images to be captured for a complete measurement can be calculated by 20×20×50=20000. With a full resolution of 2560×2160 pixels and a color depth of 16 bit, the camera can be operated at a frame rate of 28 fps with USB3 connection. Therefore, camera exposures alone took roughly 715 s.

After the measurement process was completed, the grid data for each wavelength was reassembled into a single image containing the corresponding confocal signal intensity. In this image, the background intensity of the measurement is very weak due to the confocal filtering, leading to a narrow peak around the focus position. All reassembled intensity maps can be collected into a 3D intensity cube, with two axes representing lateral directions and one axis denoting wavelength (i.e. the corresponding axial position).

Example 1: Tilted Area Scanning

For a direct area scanning with tilted focal field, the illumination was generated in a time multiplexing manner as described above. As 49 wavelength steps are taken, altogether 50 camera exposures are captured including the background image, which took less than 2 seconds.

For each tilted illumination field or tilted focal field/plane, an intensity peak is generated roughly where the illumination field or focal field intersects with the object. The background intensity level is significantly higher than an ideal confocal case, which leads to a wider intensity peak, as expected from the theoretical analysis presented above. After reordering the intensity data for each lateral column, all intensity values can be assembled into an intensity cube similar to that of the conventional method.

Analysis and Comparison

Based on measurement results, an image with extended depth of field can be generated by taking the confocal peak intensity for each lateral position. Since due to the high NA of the imaging system, areas of sharp depth changes are covered in shadows, as a post-processing step, a mask is generated based on the measurement result, so that only credible areas are presented while the rest are left blank.

To retrieve the depth information from the confocal measurement result, Gaussian fitting is implemented for the seven axial positions centered around the position with maximum intensity, in the form of $$y = A \cdot \exp\left(-\frac{(x-\mu)^2}{2\sigma^2}\right).$$

Figure 12:
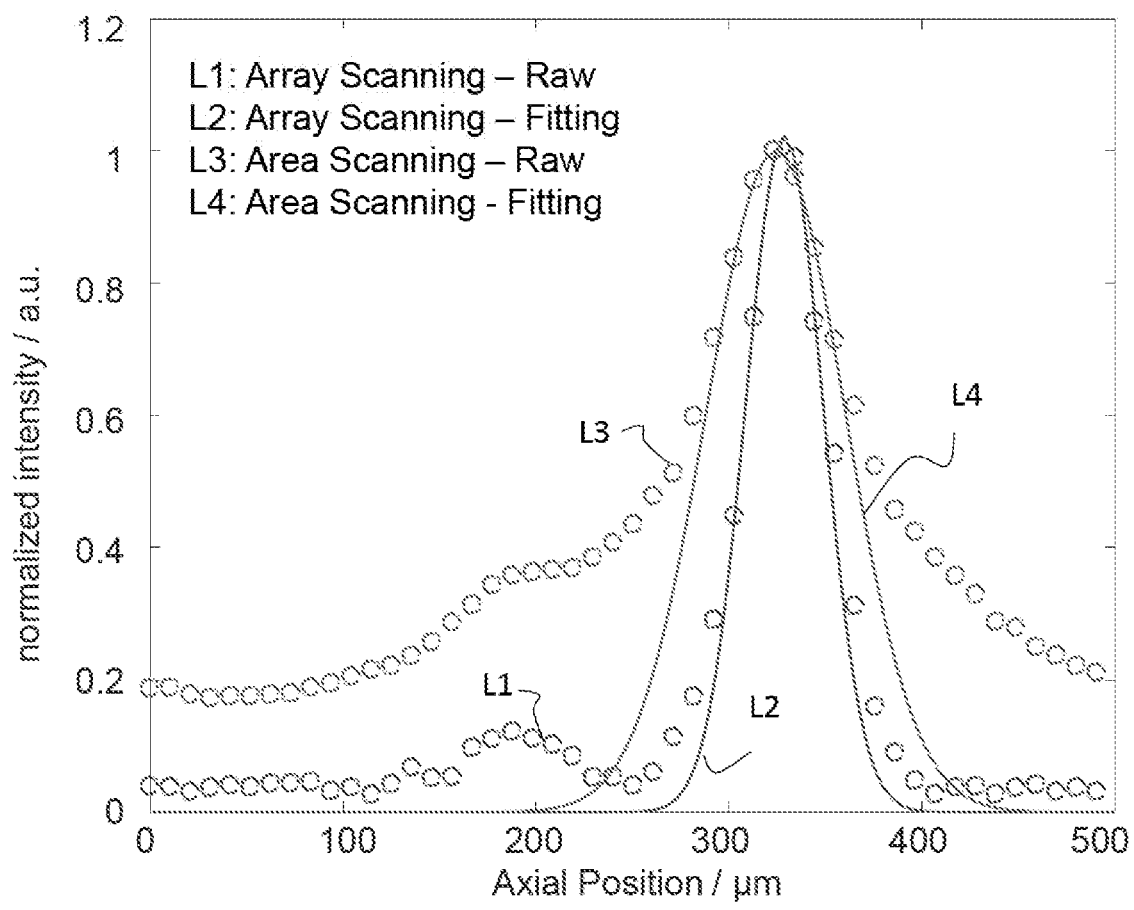
FIG. 12 shows exemplary raw measurement data and corresponding fitting result.

The center position of the Gaussian peak µ is considered as the height of the object, while σ is directly related with the FWHM of the signal peak. FIG. 12 illustrates the raw measurement data and the corresponding fitting result for one lateral location as an example. The plot has been scaled so that the maximum raw intensity for both methods are normalized. As can be seen from FIG. 12, the background level of the signal using area scanning is, as expected, higher than a conventional confocal peak. This leads to a wider peak, which results in slightly lower measurement sensitivity.

Figure 13:
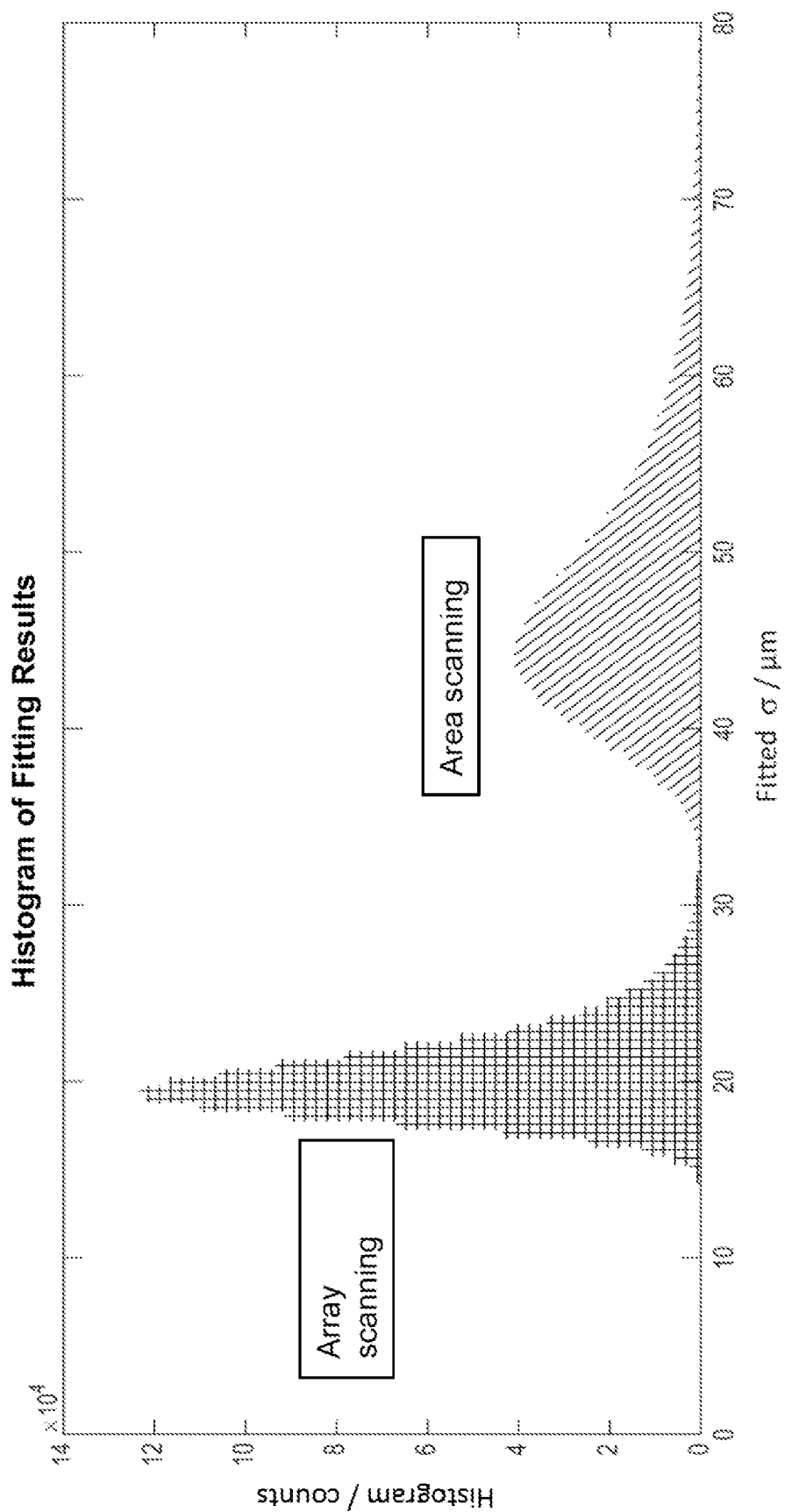

FIG. 13 shows the histograms for the fitting result of σ. The FWHM of the fitted Gaussian peak can be calculated with FWHM=$2\sqrt{2\ln 2}\sigma \approx 2.35\sigma$. For conventional array scanning, the fitted σ lies mainly around 19 μm, i.e. 45 μm in terms of FWHM, which is much wider than the ideal case. Multiple factors are responsible for this effect. First and foremost, the illumination Gaussian spectra have a certain bandwidth instead of being a Dirac pulse. Axial spanning due to chromatic aberration for the selected spectral bandwidth (1 nm) alone could be as large as 30 μm. Secondly, various optical aberrations in the practical system, calibration error of the camera as well as camera noises all contribute to the broadening of the intensity peak. Thirdly, lateral extension of the spatial DMD pixel also increases the illumination spot size which leads to a wider axial FWHM. The same effects also apply to the tilted area scanning method. Additionally, the periodic illumination pattern also adds to the cross-talk, which raises the background level of the signal, leading to a wider peak.

Upon comparison of the height maps obtained by the conventional confocal method and the proposed area scanning method, the measurement result obtained by the later method is in general slightly noisier than conventional confocal scanning. This can be explained by the wider confocal peak, which leads to a higher uncertainty. Secondly, the measurement result is slightly lower than conventional confocal scanning result across the complete measurement field. This may be caused by a different peak shape in the confocal signal captured with area scanning. This shift can be largely removed through an additional calibration process using a reference mirror. Despite these differences, measurement result using the proposed method reveals the three structure layers of the examined coin accurately. Center areas of the indentation holes can be measured without being much affected by the shadows around. The wavy profile of the European map is also truthfully demonstrated. The proposed are scanning method is, however, more than 300 times faster than the conventional array scanning method, which makes up in most applications for the slightly higher uncertainty.

Instead of using raw Gaussian fitting, it is possible to employ other specifically tailored fitting mechanisms to better account for the peak shape and better interpret the detected intensity signal obtained from the proposed direct area scanning. This would improve the measurement accuracy.

Further, considering the adaptability of the proposed setup, a complete 3D measurement task can be divided into two stages. The proposed direct area scanning method can be utilized to generate rough measurement data with very fast speed, based on which a localized conventional confocal scanning can be initiated for obtaining a better result.

Various modifications of the system shown in the above figures are possible.

For example, the use of a complex programmable light source and/or chromatic encoding in axial direction are not a prerequisite for the proposed area scanning method. Thus, the light source may be a broad spectrum light source and a diffractive grating generating spectrally coded line pattern may be employed in combination with a chromatic objective instead of a programmable light source and a spatial light modulator (such as DMD). This set-up may be used for example in combination with object scanning. Such set-up is cost effective and also allows for one-shot measurement instead of employing time multiplexing. Further, instead of using DMD other spatial light modulators such as Liquid Crystal Spatial Light Modulator may be used (in reflective or transmissive mode).

Still further, instead of generating a synthetic tilted focal plane/field by chromatic encoding, it is possible to use monochromatic light and spatial encoding, for example by using different illumination angles for each line of the projected pattern, such that each of the lines is being imaged (i.e. forms a focus) at a different depth in the object space. Such system would be generally more complex and difficult to calibrate. For example, it is possible to use a monochromatic light in a Scheimpflug configuration. In this configuration, a planar illumination source (for example an illuminated DMD) is tilted so that the normal to the light source forms an angle to the optical axis of the system. The imaging sensor plane is tilted as well so that it remains conjugate to the light source. Each of the lines of the illumination source has a different distance to the objective, thus forming a tilted focal field. The tilting angle of the planar light source is determined by the Scheimpflug principle.

The computational and control aspects described above can be implemented in digital electronic circuitry, or in computer hardware, firmware, software, or in combinations of them. When appropriate, aspects of these systems and techniques can be implemented in a computer program product, for example tangibly embodied in a machine-readable storage device for execution by a programmable processor; and method steps, such as processing the images captured by the camera, controlling any of the camera, the pattern generation unit, the pattern projection unit and/or the scanning unit, synchronizing the camera and any of the pattern generation unit, the pattern projection unit and/or the scanning unit, etc., can be performed by one or more programmable processors executing programs of instructions to perform the respective functions by operating on input data and generating an output (e.g. measurement results, control signals, synchronization signals, etc.).

To provide for interaction with a user, a computer system can be used having a display device, such as a monitor or a LCD screen for displaying information to the user and a keyboard, a pointing device such as a mouse or a trackball, a touch-sensitive screen, or any other device by which the user may provide input to computer system. The computer system can be programmed to provide a graphical user interface through which the computer program(s) interact(s) with the user.

A number of embodiments have been described. Nevertheless, it will be understood that various modifications may be made. For example, the steps described can be performed in a different order and still achieve desirable results. Accordingly, other embodiments are within the scope of the claims.

LIST OF REFERENCE NUMERALS

10 spectrally tunable light source;
101 laser (e.g. supercontinuum laser)
102 beam expander
103 mirror
104 disperser prism
105 echelle grating
106 projection lens 107 spatial light modulator (e.g. DMD)
108 collection lens
109 light guide (e.g. liquid light guide)
110, 111 beam trap
12 light guide
18 collection lens
19 beam trap
22 homogenized projector
24 achromatic objective (e.g. tube lens)
26 beam trap
20 spatial light modulator (e.g. a digital mirror device)
30 beam splitter
40 objective (e.g. chromatic objective)
50 object
52 achromatic objective (e.g. tube lens)
60 camera
FP focal plane/field
TFP tilted focal plane/field
Z optical axis of the microscope

The invention claimed is:

1. An area scanning confocal microscope comprising:
   a pattern generation unit configured to generate a line pattern comprising a plurality of lines;
   a projection unit comprising a microscope objective configured to project the line pattern onto an object through the microscope objective, wherein a focal plane (TFP) in which the line pattern is projected or imaged is tilted at a tilting angle with respect to an optical axis (z) of the microscope, the tilting angle being greater than 0° and smaller than 90°, and wherein each line of the plurality of lines is projected at a different relative height along the optical axis (z) of the microscope; and
   an imaging unit comprising a two-dimensional image detector configured to capture within one image frame of the image detector an image of the projected line pattern, wherein
   the pattern generation unit is configured to project a spectrally coded line pattern, wherein each line corresponds to a different (central) wavelength;
   the projection unit is configured to project the different wavelengths at different positions along the optical axis (z) of the microscope; and
   wherein the microscope objective is a chromatic objective with a predefined wavelength dispersion along the optical axis (z) of the microscope.

2. The area scanning confocal microscope according to claim 1, wherein the tilting angle is in the range of 30° to 85°, optionally in the range of 50° to 85° or in the range of 65° to 85°.

3. The area scanning confocal microscope according to claim 1, wherein the tilted focal plane (TFP) is realized by temporal multiplexing, wherein within one image frame of the two-dimensional image detector different lines of the line pattern are successively captured.

4. The area scanning confocal microscope according to claim 1, wherein the pattern generation unit comprises a spectrally tunable light source and/or a spatial light modulator, wherein the spatial light modulator is optionally a digital mirror device.

5. The area scanning confocal microscope according to claim 4, wherein the spatial light modulator and the two-dimensional image detector are arranged in a Scheimpflug configuration.

6. An area scanning confocal microscope according to claim 1, wherein the pattern generation unit is configured to generate multiple periods of the line illumination pattern being projected or imaged by the projection unit into corresponding multiple tilted focal planes (TFP).

7. An area scanning method for performing confocal measurement of an object using a confocal microscope, comprising:
   generating a line pattern comprising a plurality of lines;
   projecting the line pattern through a microscope objective of the confocal microscope onto the object, wherein a focal plane (TFP) in which the line pattern is projected or imaged is tilted at a tilting angle with respect to an optical axis (z) of the microscope, the tilting angle being greater than 0° and smaller than 90°, and wherein projecting the line pattern further includes projecting each line of the plurality of lines at a different relative height along the optical axis (z) of the microscope; and
   capturing by a two-dimensional image detector within one image frame of the image detector an image of the projected line pattern, wherein the line pattern is a spectrally coded line pattern, wherein each line corresponds to a different (central) wavelength; and
   wherein the different wavelengths are projected at different positions along the optical axis (z) of the microscope; optionally by employing a chromatic objective with a predefined wavelength dispersion along the optical axis (z) of the microscope.

8. The method according to claim 7, wherein the tilting angle is in the range of 65° to 85°, preferably in the range of 30° to 85°, optionally in the range of 50° to 85° or in the range of 65° to 85°.

9. The method according to claim 7, wherein generating the line pattern comprises changing the wavelength of a spectrally tunable light source; and/or spatially filtering a wavelength from the light emitted from a light source.

10. The method according to claim 7, further comprising performing temporal multiplexing, wherein within one image frame different lines of the line pattern are successively captured, in order to realize the tilted focal plane (TFP).

11. The method according to claim 7, wherein:
   generating the line pattern comprises generating multiple periods of the line illumination pattern;
   projecting the line pattern comprises projecting the multiple periods of the line illumination pattern into corresponding multiple tilted focal planes; and
   capturing an image of the projected pattern comprises capturing, within one image frame, an image of the multiple periods of the line illumination pattern projected onto the object.

* * * * *